United States Patent
Barake et al.

(10) Patent No.: US 11,817,968 B1
(45) Date of Patent: Nov. 14, 2023

(54) METHODS AND DEVICES FOR ROUTING CONTROLLER AREA NETWORK TRAFFIC OVER A UNIVERSAL SERIAL BUS CONNECTION

(71) Applicant: Geotab Inc., Oakville (CA)

(72) Inventors: Omar Barake, Waterloo (CA); Daniel Bernal Dotu, Madrid (ES); Naim Hilal, Toronto (CA); Michael Pirruccio, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/223,300

(22) Filed: Jul. 18, 2023

Related U.S. Application Data

(60) Provisional application No. 63/442,781, filed on Feb. 2, 2023.

(51) Int. Cl.
*H04L 12/40* (2006.01)

(52) U.S. Cl.
CPC .... *H04L 12/40* (2013.01); *H04L 2012/40215* (2013.01); *H04L 2012/40273* (2013.01)

(58) Field of Classification Search
CPC .......... H04L 12/40; H04L 2012/40215; H04L 2012/40273
See application file for complete search history.

(56) References Cited

U.S. PATENT DOCUMENTS

| | | |
|---|---|---|
| 6,844,827 B2 | 1/2005 | Flick |
| 6,941,223 B2 | 9/2005 | Schuessler |
| 7,206,837 B2 | 4/2007 | Seligmann |
| 7,683,774 B2 | 3/2010 | Olsen et al. |
| 9,872,225 B2 | 1/2018 | Guba et al. |
| 9,981,615 B2 | 5/2018 | Flick |
| 9,981,616 B2 | 5/2018 | Flick |
| 10,984,613 B2 | 4/2021 | Capozza |
| 11,127,226 B2 | 9/2021 | Zucconelli et al. |
| 11,145,208 B1 | 10/2021 | Nanda et al. |
| 2011/0087805 A1* | 4/2011 | Liu ................... G06F 13/4081 710/14 |
| 2015/0146582 A1* | 5/2015 | Galan .................. H04L 5/1461 370/278 |
| 2019/0042281 A1* | 2/2019 | Raghav ............... G06F 13/4282 |
| 2022/0012202 A1* | 1/2022 | Regupathy ......... G06F 13/4059 |

* cited by examiner

Primary Examiner — Henry Tsai
Assistant Examiner — John B Roche
(74) Attorney, Agent, or Firm — Sherif A. Abdel-Kader

(57) ABSTRACT

A host electronic device that supports both Universal Serial Bus (USB) and Controller Area Network (CAN) connections is provided. When the host electronic device detects connection from a peripheral electronic device that uses the CAN protocol, the host electronic device switches to USB-C alternate mode and routes CAN signals over sideband use signals.

20 Claims, 20 Drawing Sheets

| GND | TX1+ | VBUS | CC1 | D+ | D- | SBU1 | VBUS | RX2- | RX2+ | GND |
|---|---|---|---|---|---|---|---|---|---|---|
| GND | RX1+ | VBUS | SBU2 | D- | D+ | SBU1 | VBUS | TX2- | TX2+ | GND |

USB-C receptacle port pins/signals

Figure 9A

| GND | RX2+ | RX2- | VBUS | SBU1 | D- | D+ | CC | VBUS | TX1- | TX1+ | GND |
|---|---|---|---|---|---|---|---|---|---|---|---|
| GND | RX1+ | RX1- | VBUS | VCONN | | | SBU2 | VBUS | RX1- | RX1+ | GND |

USB-C plug port pins/signals

Figure 9B

| Rp | Rd | Vbus Current Limit |
|---|---|---|
| 56K | 5.1K | USB Default (500mA or 900mA) |
| 22K | 5.1K | 1.5A @ 5V |
| 10K | 5.1K | 3.0A @ 5V |

METHODS AND DEVICES FOR ROUTING CONTROLLER AREA NETWORK TRAFFIC OVER A UNIVERSAL SERIAL BUS CONNECTION

RELATED APPLICATIONS

This application claims priority from U.S. provisional patent application 63/442,781 filed on Feb. 2, 2023, the contents of which are herein incorporated by reference in their entirety.

FIELD

The present disclosure generally relates to electronic devices with wired communications capabilities, and more specifically to methods and devices for routing Controller Area Network (CAN) traffic over a Universal Serial bus (USB) connection.

BACKGROUND

A telematics system may gather asset data using a telematics device. The asset may be a vehicle ("vehicular asset") or some stationary equipment. In the case of a vehicular asset, the telematics device may gather the asset data through an onboard diagnostic port (OBD) using the Controller Area Network (CAN) protocol. Additionally, the telematics device may gather sensor data and location data pertaining to the asset. The gathered asset data, sensor data and location data may be received and recorded by a technical infrastructure of the telematics system, such as a telematics server, and used in fleet management tools, telematics services, or data analysis.

An electronic device, such as a telematics device, may connect with peripheral devices which provide additional capabilities. Such peripheral devices may communicate with the electronic device using one or more protocols such as the CAN protocol and the Universal Serial Bus (USB).

SUMMARY

In one aspect of the present disclosure, there is provided a method in a host electronic device having a USB-C port configured as a downlink facing port (DFP). The method comprises detecting by a configuration channel controller of the USB-C port a connection with a peripheral electronic device over a host device connector of the USB-C port and in response to receiving from the peripheral electronic device a first indication indicating that the peripheral electronic device uses a USB protocol commencing communication with the peripheral electronic device using the USB protocol over a plurality of USB signal lines of the USB-C port. In response to receiving from the peripheral electronic device a second indication indicating that the peripheral electronic device uses a Controller Area Network (CAN) protocol the method further comprises configuring the USB-C port to work in a USB-C alternate mode, determining a plurality of USB-C alternate mode signals used by the peripheral electronic device, routing the plurality of USB-C alternate mode signals used by the peripheral electronic device to a CAN transceiver of the host electronic device, and commencing communication with the peripheral electronic device using the CAN protocol. Advantageously, the host electronic device can support connections from peripheral devices using either the USB protocol or the CAN protocol over a single connector while also maintaining compliance with the USB-C standard.

Detecting the connection with the peripheral electronic device may include detecting an orientation of a peripheral device connector in relation to the host device connector.

Commencing communication may comprise swapping the USB-C alternate mode signals used by the peripheral electronic device based on the orientation of the peripheral device connector in relation to the host device connector. Advantageously, swapping the USB-C alternate mode signals based on the orientation of the peripheral device connector ensures that the correct CAN signal is passed to the transceiver regardless of the connector orientation.

The CAN transceiver may include a polarity control module, and swapping USB-C alternate mode signals may comprise providing an indication of the orientation to the CAN transceiver. Using a CAN transceiver with a built-in polarity control module alleviates the need to add additional circuitry for swapping the signals based on the orientation of the connector.

Routing the plurality of USB-C alternate mode signals used by the peripheral electronic device may comprises configuring a switch to pass the plurality of USB-C alternate mode signals used by the peripheral electronic device from the host device connector to the CAN transceiver based on the second indication. Advantageously, the USB-C alternate mode signals are not passed to the CAN transceiver until the host device controller has ascertained that the peripheral electronic device uses the CAN protocol in alternate USB-C mode.

The second indication may comprise a configuration channel message received by the configuration channel controller.

The configuration channel message may specify the plurality of USB-C alternate mode signals used by the peripheral electronic device to send CAN data frames. Advantageously, the alternate mode signals used by the peripheral electronic device do not need to be predetermined.

Determining the plurality of USB-C alternate mode signals may comprises extracting the plurality of USB-C alternate mode signals used by the peripheral electronic device from the configuration channel message. Advantageously, the alternate mode signals used by the peripheral electronic device do not need to be predetermined.

The plurality of USB-C alternate mode signals used by the peripheral electronic device may comprise a first sideband use signal (SBU1) and a second sideband use signal (SBU2). The sideband use signals are not used by the USB protocol and are thus appropriate for use for routing CAN signals.

A CAN High (CANH) signal may be sent over the first sideband use signal (SBU1), and a CAN Low (CANL) signal may be sent over the second sideband use signal (SBU2).

In another aspect of the present disclosure, there is provided a host electronic device comprising a controller, a switch coupled to the controller, a controller area network (CAN) transceiver coupled to the switch, a USB-C port including a configuration channel controller and a host device connector the USB-C port coupled to both the switch and to the controller, and a memory coupled to the controller. The memory is storing machine-executable programming instructions which when executed by the controller configure the host electronic device to detect by the configuration channel controller a connection with a peripheral electronic device, over the host device connector and in response to receiving a first indication that the peripheral electronic device uses a USB protocol commence communication with the peripheral electronic device using the USB protocol over a plurality of USB signal lines of the USB-C port. The machine-executable programming instructions when executed by the controller further configure the host electronic device to in response to receiving from the peripheral electronic device a second indication that the peripheral electronic device uses a (CAN) protocol, configure the USB-C port to work in a USB-C alternate mode, determine a plurality of USB-C alternate mode signals used by the peripheral electronic device, pass the plurality of USB-C alternate mode signals to the CAN transceiver, and commence communication with the peripheral electronic device using the CAN protocol. Advantageously, the host electronic device can support connections from peripheral devices using either the USB protocol or the CAN protocol over a single connector while also maintaining compliance with the USB-C standard.

The machine-executable programming instructions which configure the host electronic device to detect the connection with the peripheral electronic device may comprise machine-executable programming instructions which configure the host electronic device to detect an orientation of a peripheral device connector in relation to the host device connector.

The machine-executable programming instructions which configure the host electronic device to commence communication may comprise machine-executable programming instructions which configure the host electronic device to swap the plurality of USB-C alternate mode signals used by the peripheral electronic device based on the orientation of the peripheral device connector in relation to the host device connector. Advantageously, swapping the USB-C alternate mode signals based on the orientation of the peripheral device connector ensures that the correct CAN signal is passed to the transceiver regardless of the connector orientation.

The CAN transceiver may include a polarity control module and the machine-executable programming instructions which configure the host electronic device to swap the plurality of USB-C alternate mode signals may comprise machine-executable programming instructions which configure the configuration channel controller to provide an indication of the orientation to the CAN transceiver. Using a CAN transceiver with a built-in polarity control module alleviates the need to add additional circuitry for swapping the signals based on the orientation of the connector.

The machine-executable programming instructions which configure the host electronic device to pass the plurality of USB-C alternate mode signals used by the peripheral electronic device may comprise machine-executable programming instructions which configure the host electronic device to configure the switch to pass the plurality of USB-C alternate mode signals used by the peripheral electronic device from the host device connector to the transceiver based on the second indication. Advantageously, the USB-C alternate mode signals are not passed to the CAN transceiver until the host device controller has ascertained that the peripheral electronic device uses the CAN protocol in alternate USB-C mode.

The second indication may comprise a configuration channel message received by the configuration channel controller.

The configuration channel message may specify the plurality of USB-C alternate mode signals used by the peripheral electronic device to send CAN data frames. Advantageously, the alternate mode signals used by the peripheral electronic device do not need to be predetermined.

The plurality of USB-C alternate mode signals used by the peripheral electronic device may comprise a first sideband use signal (SBU1) and a second sideband use signal (SBU2). The sideband use signals are not used by the USB protocol and are thus appropriate for use for routing CAN signals.

A CAN High (CANH) signal may be sent over the first sideband use signal (SBU1), and a CAN Low (CANL) signal may be sent over the second sideband use signal (SBU2).

BRIEF DESCRIPTION OF THE DRAWINGS

Exemplary non-limiting embodiments of the present invention are described with reference to the accompanying drawings in which:

FIG. 9A depicts a USB host's receptacle port pins;

FIG. 9B depicts a USB peripheral device's plug port pins;

FIG. 15B depicts the host device subsystem of FIG. 15A connected to a USB peripheral device;

DETAILED DESCRIPTION

Figure 1:
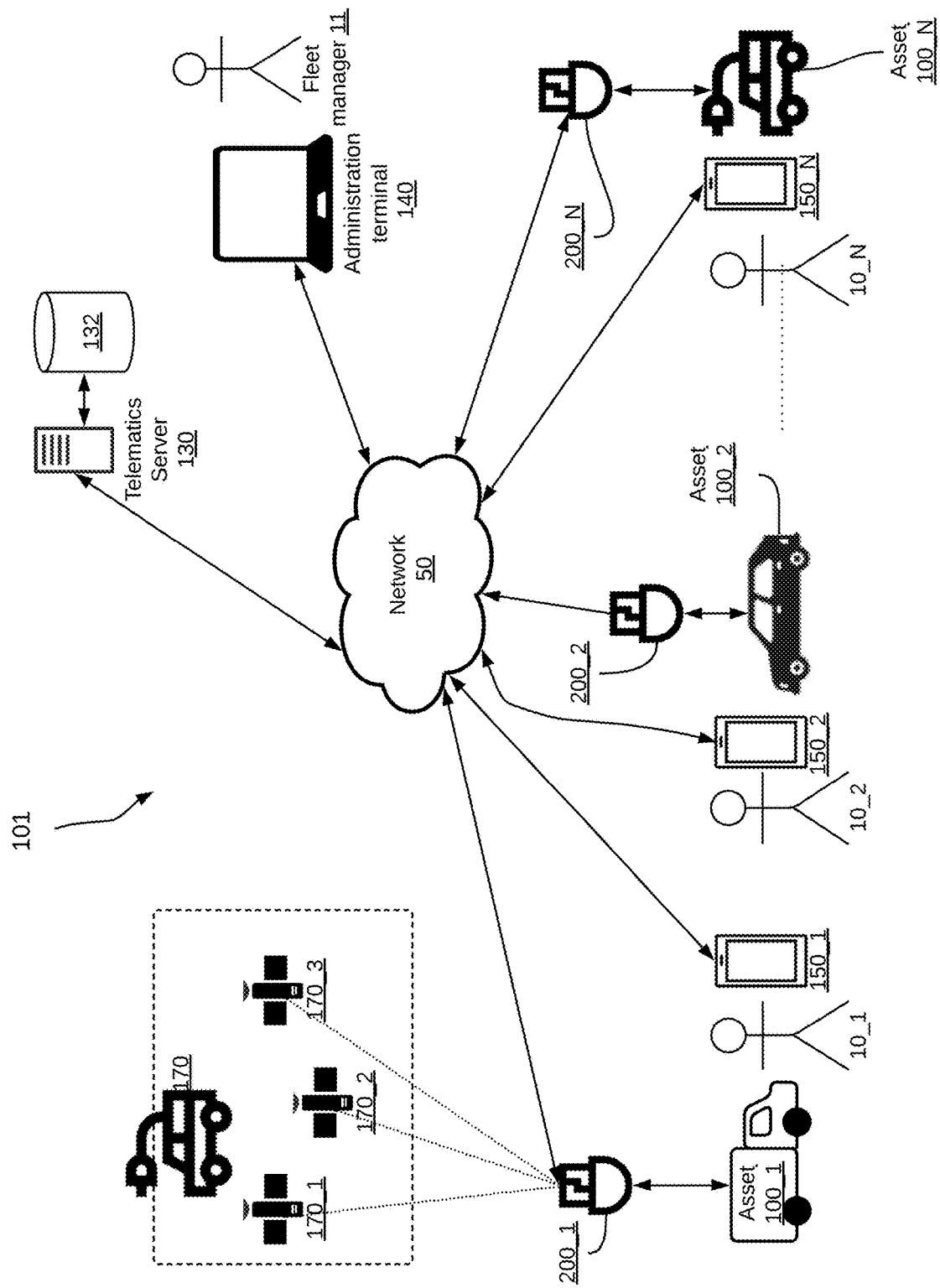
FIG. 1 is a schematic diagram of a telematics system including a plurality of telematics devices coupled to a plurality of assets.

The present disclosure relates generally to methods and devices for routing Controller Area Network (CAN) data over a Universal Serial Bus (USB) connection. The methods and devices also allow for routing USB data over the same USB connection. The USB connection used in the methods and devices is a USB Type C ("USB-C") connection.

A first method is provided for routing CAN data over a USB Type-C port (USB-C port) by utilizing the USB-C alternate mode provided by the USB-C standard. In the first method, a host electronic device expects a peripheral device connected therewith to send at least one configuration message thereto indicating that the peripheral electronic device uses the CAN protocol. In response to receiving the configuration message, the host electronic device enables USB-C alternate mode, and commences communication with the peripheral electronic device using the CAN protocol over USB-C alternate mode signal lines of the USB interface.

In one implementation of the first method, the peripheral electronic device contains a USB configuration channel controller (sometimes also referred to as the "configuration channel logic block") which communicates with a USB configuration channel controller (CCC) of the host electronic device. In this disclosure, a USB configuration channel controller is referred to as a "configuration channel controller." The configuration channel controller of the peripheral electronic device sends the at least one configuration message indicating, to the host electronic device, that the peripheral electronic device uses the CAN protocol.

In another implementation of the first method, the peripheral electronic device is a CAN peripheral electronic device, which does not contain a configuration channel controller and only provides CAN signals via an external connector thereof. In such an implementation, an interface converter is needed to connect the peripheral interface device to the USB port of the host interface device, and to provide the at least one configuration message indicating that the peripheral electronic device uses the CAN protocol. The interface converter is described below.

The first method described briefly above provides connecting a CAN peripheral electronic device to a host electronic device that supports both the USB protocol and the CAN protocol. The first method utilizes the alternate mode available in the USB Type-C specification. Advantageously, a host electronic device supporting the first method is still in compliance with the USB standard.

In another aspect of the present disclosure, there is provided an interface converter and a method by the interface converter for connecting a CAN peripheral electronic device to a host electronic device over a USB-C connection. The interface converter has a CAN interface that receives CAN signals via a first connector. The interface converter also has a USB interface providing USB signals via a USB-C connector. The interface converter has a configuration controller for communicating with the configuration channel controller of a USB host electronic device and for sending at least one configuration message thereto indicating that the interface converter is a CAN device using USB-C alternate mode. The configuration channel controllers of the interface converter and the host electronic device thus negotiate an alternate mode in which the interface converter routes CAN signals over USB signal lines that are designated for use in USB-C alternate mode, and the host electronic device receives and interprets the CAN signals on those USB signal lines.

The interface converter has the advantage that a peripheral electronic device using the CAN protocol does not need to implement any additional USB circuitry for enabling USB-C alternate mode to communicate with the host electronic device. Any CAN peripheral electronic device may connect to a USB-C host electronic device via the interface converter. Accordingly, the cost of purchasing the interface converter is only incurred when connecting a CAN peripheral electronic device. A USB peripheral electronic device may directly connect to the host electronic device and work in USB mode.

In some implementations, the USB signal lines used for routing CAN signals in USB-C alternate mode are the sideband-use (SBU) signal lines. Specifically the signals CAN+ or CAN High (aka CANH) and CAN− or CAN Low (aka CANL) are routed over the USB signal lines SBU1 and SBU2, as will be described below.

In another aspect of the present disclosure, a second method by a host electronic device is provided for detecting whether a peripheral electronic device connected to a USB-C connector of the USB host electronic device uses the CAN protocol or the USB protocol. The method includes the host electronic device measuring the impedance of a number of signals on the USB-C signal lines of the USB-C connector thereof to identify the type of peripheral electronic device connected to the USB-C connector.

In some implementations of the second method, the USB signal lines are first checked to determine whether the peripheral electronic device connected to the USB-C connector uses the USB protocol or another non-USB protocol, such as the CAN protocol. For example, a host electronic device may measure the impedance of USB signal lines D+/D− on the USB-C connector. If the impedance indicates that the USB signal lines are in use, then the host electronic device determines that the peripheral electronic device uses the USB protocol. In some embodiments, if the impedance on the USB signal lines D+/D− indicate that the peripheral electronic device does not use the USB protocol, the host electronic device may conclude that the peripheral electronic device uses the CAN protocol. This may be the case if older USB protocols using the D+/D− signal lines are the only ones supported and the only other possible protocol is the CAN protocol.

In some implementations of the second method, the host electronic device alternatively or additionally checks signal lines which are not used by the USB protocol and may be used by the CAN protocol. For example, if the CAN signals are routed through the sideband-use signal lines on the USB-C connector, then the host electronic device measures the impedance on the sideband-use signal lines. If the impedance measured on the sideband-use indicates that the sideband-use signals are used then the host electronic device determines that the peripheral electronic device uses the CAN protocol If the host electronic device determines that the peripheral electronic device uses the USB protocol, then the controller enables USB host mode and the host electronic device negotiates a USB connection with the peripheral electronic device as known in the art.

If the host electronic device determines that the peripheral electronic device uses the CAN protocol, then the controller disables USB interface circuitry and routes the sideband-use signals to a CAN interface module. The CAN interface module conditions the CAN signal levels so they can be processed by a controller of the host electronic device. The CAN interface module provides digital signals to the controller for processing.

This disclosure describes the above methods and devices in the context of a telematics device and an input/output expander that connects thereto. However, it should be apparent to those of skill in the art that the methods and devices described herein are not limited by this context. The methods and devices described herein can be used by any USB host electronic device so that it may accept connections from a peripheral electronic device that uses the CAN protocol. A telematics system employing a telematics device is described below as an example of an application of a telematics device.

Telematics System

A large telematics system may collect data from a high number of assets, either directly or through telematic devices. A telematics device may refer to a self-contained device installed at an asset, or a telematics device that is integrated into the asset itself. In either case, it may be said that telematics data is being captured or gathered by the telematics device. FIG. 1 shows a high-level block diagram of a telematics system 101. The telematics system 101 includes a telematics server 130, (N) telematics devices shown as telematics device 200_1, telematics device 200_2 . . . through telematics device 200_N ("telematics device 200"), a network 50, administration terminal 140, and operator terminals 150_1, 150_2 . . . through 150_N ("the operator terminals 150"). FIG. 1 also shows a plurality of (N) assets named as asset 100_1, asset 100_2 . . . asset 100_N ("asset 100") coupled to the telematics device 200_1, telematics device 200_2 . . . telematics device 200_N, respectively. Additionally, FIG. 1 shows a plurality of satellites 170_1, 170_2 and 170_3 ("the satellites 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car that typically runs on an internal combustion engine (ICE). The asset 100_3 is shown as an electric vehicle (EV). Other types of vehicles, which are not shown, are also contemplated in the various embodiments of the present disclosure, including but not limited to, farming vehicles, construction vehicles, military vehicles, and the like.

The telematics devices 200 are electronic devices which are coupled to assets 100 and configured to capture asset data from the assets 100. For example, in FIG. 1 the telematics device 200_1 is coupled to the asset 100_1. Similarly, the telematics device 200_2 is coupled to the asset 100_2 and the telematics device 200_3 is coupled to the asset 100_3. The components of a telematics device 200 are explained in further detail with reference to FIG. 2.

The network 50 may be a single network or a combination of networks such as a data cellular network, the Internet, and other network technologies. The network 50 may provide connectivity between the telematics devices 200 and the telematics server 130, between the administration terminal 140 and the telematics server 130, and between the operator terminals 150 and the telematics server 130.

The telematics server 130 is an electronic device executing machine-executable programming instructions which enable the telematics server 130 to store and analyze telematics data. The telematics server 130 may be a single computer system or a cluster of computers. The telematics server 130 may be running an operating system such as Linux, Windows, Unix, or any other equivalent operating system. Alternatively, the telematics server 130 may be a software component hosted on a cloud service, such as Amazon Web Service (AWS). The telematics server 130 is connected to the network 50 and may receive telematics data from the telematics devices 200. The telematics server 130 may have a plurality of software modules for performing data analysis and analytics on the telematics data to obtain useful asset information about the assets 100. The telematics server 130 may be coupled to a telematics database 132 for storing telematics data and/or the results of the analytics which are related to the assets 100. The asset information stored may include operator information about the operators 10 corresponding to the assets. The telematics server 130 may communicate the asset data and/or the operator information pertaining to an asset 100 to one or more of: the administration terminal 140, and the operator terminal 150.

The satellites 170 may be part of a global navigation satellite system (GNSS) and may provide location information to the telematics devices 200. The location information may be processed by a location module on the telematics device 200 to provide location data indicating the location of the telematics device 200 (and hence the location of the asset 100 coupled thereto). A telematics device 200 that can periodically report an asset's location is often termed an "asset tracking device".

The administration terminal 140 is an electronic device, which may be used to connect to the telematics server 130 to retrieve data and analytics related to one or more assets 100 or to issue commands to one or more telematics device 200 via the telematics server 130. The administration terminal 140 is shown as a laptop computer, but may also be a desktop computer, a tablet (not shown), or a smartphone. The administration terminal 140 may run a web browser or a custom application which allows retrieving data and analytics, pertaining to one or more assets 100, from the telematics server 130 via a web interface of the telematics server 130. The administration terminal 140 may also be used to issue commands to one or more telematics device 200 via the telematics server 130. A fleet manager 11 may communicate with the telematics server 130 using the administration terminal 140. In addition to retrieving data and analytics, the administration terminal 140 allows the fleet manager 11 to set alerts and geofences for keeping track of the assets 100, receiving notifications of deliveries, and so on.

The operator terminals 150 are electronic devices, such as smartphones or tablets. The operator terminals 150 are used by operators 10 (for example, vehicle drivers) of the assets 100 to both track and configure the usage of the assets 100. For example, as shown in FIG. 1, the operator 10_1 has the operator terminal 150_1, the operator 10_2 has the operator terminal 150_2, and the operator 10_N has the operator terminal 150_N. Assuming the operators 10 all belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 150 are in communication with the telematics server 130 over the network 50. The operator terminals 150 may run at least one asset configuration application. The asset configuration application may be used by operator 10 to inform the telematics server 130 that asset 100 is currently being operated by operator 10. For example, the operator 10_2 may use an asset configuration application on the operator terminal 150_2 to indicate that the operator 10_2 is currently using the asset 100_2. The telematics server 130 updates the telematics database 132 to indicate that the asset 100_2 is currently associated with the operator 10_2. Additionally, the asset configuration application may be used to report information related to the operation duration of the vehicle, the number of stops made by the operator during their working shift, and so on. Furthermore, the asset configuration application may allow the operator to configure the telematics device 200 coupled to the asset 100 that the operator 10 is operating.

In operation, a telematics device 200 is coupled to an asset 100 to capture asset data. The asset data may be combined with location data obtained by the telematics device 200 from a location module in communication with the satellites 170 and/or sensor data gathered from sensors in the telematics device 200 or another device coupled to the telematics device 200. The combined asset data, location data, and sensor data may be termed "telematics data." The telematics device 200 sends the telematics data to the telematics server 130 over the network 50. The telematics server 130 may process, aggregate, and analyze the telematics data to generate asset information pertaining to the assets 100 or to a fleet of assets. The telematics server 130 may store the telematics data and/or the generated asset information in the telematics database 132. The administration terminal 140 may connect to the telematics server 130, over the network 50, to access the generated asset information. Alternatively, the telematics server 130 may push the generated asset information to the administration terminal 140. Additionally, the operators 10, using their operator terminals 150, may indicate to the telematics server 130 which assets 100 they are associated with. The telematics server 130 updates the telematics database 132 accordingly to associate the operator 10 with the asset 100. Furthermore, the telematics server 130 may provide additional analytics related to the operators 10 including work time, location, and operating parameters. For example, for vehicle assets, the telematics data may include turning, speeding, and braking information. The telematics server 130 can correlate the telematics data to the vehicle's driver by querying the telematics database 132. A fleet manager 11 may use the administration terminal 140 to set alerts for certain activities pertaining to the assets 100. When criteria for an alert is met, the telematics server 130 sends a message to the administration terminal 140 to notify a fleet manager 11, and may optionally send alerts to the operator terminal 150 to notify an operator 10 of the alert. For example, a vehicle driver operating the vehicle outside of a service area or hours of service may receive an alert on their operator terminal 150. A fleet manager 11 may also use the administration terminal 140 to configure a telematics device 200 by issuing commands thereto via the telematics server 130. Alerts may also be sent to the telematics device 200 to generate an alert to the driver such as a beep, a displayed message, or an audio message.

Telematics Device

Figure 2:
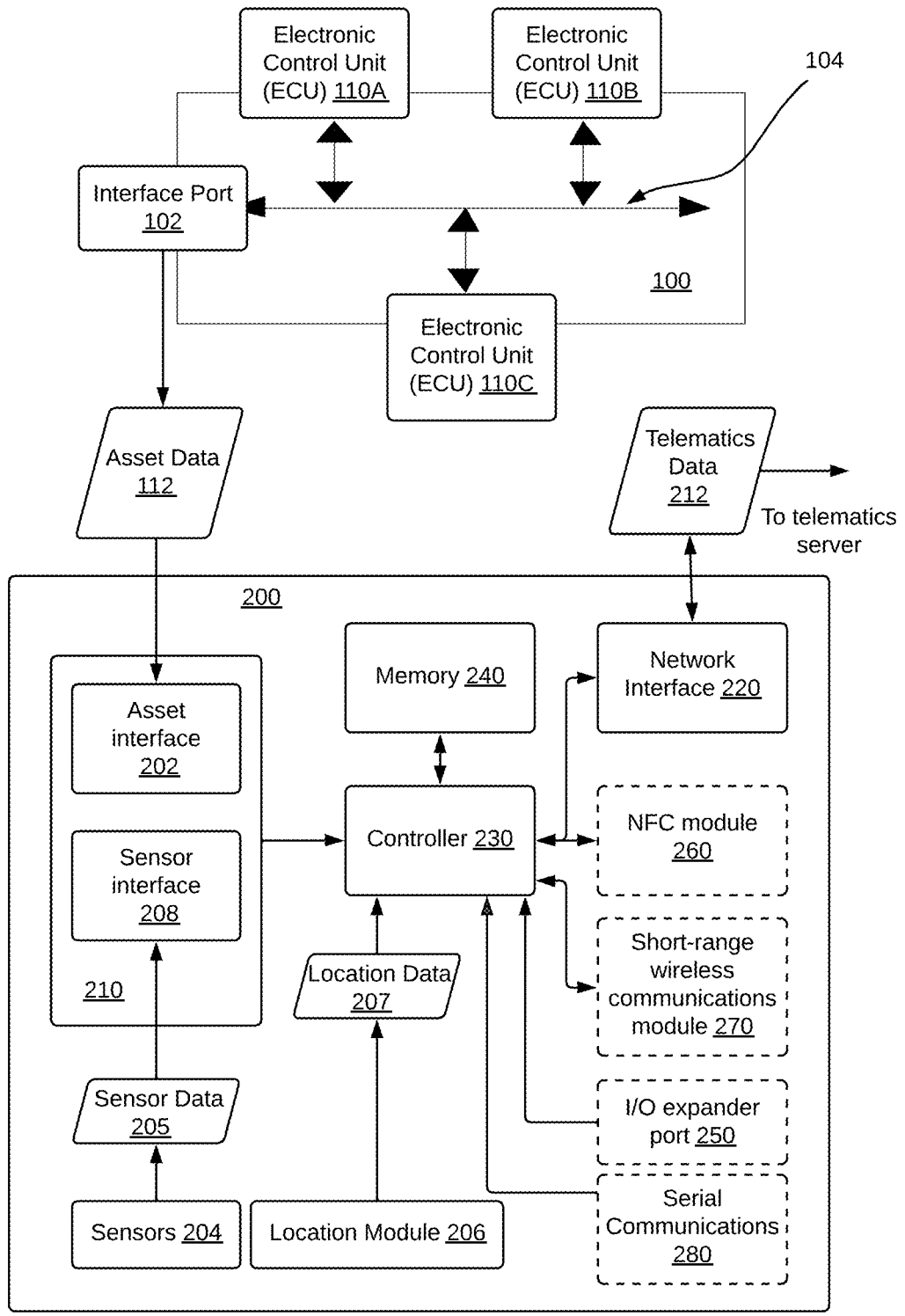
FIG. 2 is a block diagram showing a telematics device coupled to an asset.

Further details relating to the telematics device 200 and how it interfaces with an asset 100 are shown with reference to FIG. 2. FIG. 2 depicts an asset 100 and a telematics device 200 coupled thereto. Selected relevant components of each of the asset 100 and the telematics device 200 are shown.

The asset 100 may have a plurality of electronic control units (ECUs). An ECU is an electronic module which interfaces with one or more sensors for gathering information from the asset 100. For example, an engine coolant temperature (ECT) ECU may contain a temperature sensor and a controller for converting the measured temperature into digital data representative of the oil temperature. Similarly, a battery voltage ECU may contain a voltage sensor for measuring the voltage at the positive battery terminal and a controller for converting the measured voltage into digital data representative of the battery voltage. A vehicle may, for example, have around seventy ECUs. For simplicity, only a few of the ECUs 110 are depicted in FIG. 2. For example, in the depicted embodiment the asset 100 has three ECUs shown as the ECU 110A, the ECU 110B, and the ECU 110C ("the ECUs 110"). The ECU 110A, the ECU 110B, and the ECU 110C are shown to be interconnected via an asset communications bus. One example of an asset communications bus is a Controller Area Network (CAN) bus. For example, in FIG. 2 the ECUs 110 are interconnected using the CAN bus 104. The ECUs 110 send and receive information to one another in CAN data frames by placing the information on the CAN bus 104. When an ECU 110 places information on the CAN bus 104, other ECUs 110 receive the information and may or may not consume or use that information. Different protocols may be used to exchange information between the ECUs over a CAN bus. For example, ECUs 110 in trucks and heavy vehicles use the Society of Automotive Engineering (SAE) J1939 protocol to exchange information over a CAN bus 104. Most passenger vehicles use the SAE J1979 protocol, which is commonly known as On-Board Diagnostic (OBD) protocol to exchange information between ECUs 110 on their CAN bus 104. In industrial automation, ECUs use a CANOpen protocol to exchange information over a CAN bus 104. An asset 100 may allow access to information exchanged over the CAN bus 104 via an interface port 102. For example, if the asset 100 is a passenger car, then the interface port 102 is most likely an OBD-II port. Data accessible through the interface port 102 is termed the asset data 112. In some embodiments, the interface port 102 includes a power interface for providing electric power to a telematics device 200 connected thereto.

The telematics device 200 includes a controller 230 coupled to a memory 240, an interface layer 210 and a network interface 220. The telematics device 200 also includes one or more sensors 204 and a location module 206 coupled to the interface layer 210. The telematics device 200 may also contain some optional components, shown in dashed lines in FIG. 2. For example, the telematics device 200 may contain one or more of: an I/O expander port 250, a near-field communications (NFC) module such as NFC module 260, and a short-range wireless communications module 270. In some embodiments (not shown), the telematics device 200 may have a dedicated power source or a battery. In other embodiments, the telematics device 200 may receive power directly from the asset 100, via the interface port 102. The telematics device 200 shown is an example. Some of the components shown in solid lines may also be optional and may be implemented in separate modules. For example, some telematics devices (not shown) may not have a location module 206 and may rely on an external location module for obtaining the location data 207.

Some telematics devices may not have any sensors 204 and may rely on external sensors for obtaining sensor data 205.

The controller 230 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, the actions performed by the controller 230 as described herein. The controller 230 may have an internal memory for storing machine-executable programming instructions to conduct the methods described herein.

The memory 240 may include read-only-memory (ROM), random access memory (RAM), flash memory, magnetic storage, optical storage, and similar, or any combination thereof, for storing machine-executable programming instructions and data to support the functionality described herein. The memory 240 is coupled to the controller 230 thus enabling the controller 230 to execute the machine-executable programming instructions stored in the memory 240 and to access the data stored therein. The memory 240 may be storing machine-executable programming instructions, which when executed by the controller 230, configures the telematics device 200 for receiving asset data 112 from the asset 100 via the asset interface 202, and for receiving sensor data 205 from the sensors 204 and/or location data 207 from the location module 206 via the sensor interface 208. The memory 240 may also contain machine-executable programming instructions for combining asset data 112, sensor data 205 and location data 207 into telematics data 212. Additionally, the memory 240 may further contain instructions which, when executed by the controller 230, configures the telematics device 200 to transmit the telematics data 212 via the network interface 220 to a telematics server 130 over a network 50. In some embodiments, the memory 240 only stores data, and the machine-executable programming instructions for conducting the aforementioned tasks are stored in an internal memory of the controller 230.

The location module 206 may be a global positioning system (GPS) transceiver or another type of location determination peripheral that may use, for example, wireless network information for location determination. The location module 206 is coupled to the controller 230 and provides location data 207 thereto. The location data 207 may be in the form of a latitude and longitude, for example.

The sensors 204 may be one or more of: a temperature sensor, a pressure sensor, an optical sensor, a motion sensor such as an accelerometer, a gyroscope, or any other suitable sensor indicating a condition pertaining to the asset 100 to which the telematics device 200 is coupled. The sensors provide sensor data 205 to the controller 230 via the sensor interface 208.

The interface layer 210 may include a sensor interface 208 and an asset interface 202. The sensor interface 208 is configured for receiving the sensor data 205 from the sensors 204. For example, the sensor interface 208 interfaces with the sensors 204 and receives the sensor data 205 therefrom. The asset interface 202 receives asset data 112 from the asset 100. In the depicted embodiment, the asset interface 202 is coupled to the interface port 102 of the asset 100. The asset data 112, received at the telematics device 200, from the asset 100 may be in the form of data messages, such as CAN data frames. The asset data 112 may describe one or more of any of: a property, a state, and an operating condition of the asset 100. For example, where the asset 100 is a vehicle, the data may describe the speed at which the vehicle is traveling, a state of the vehicle (off, idle, or running), or an engine operating condition (e.g., engine oil temperature, engine revolutions-per-minutes (RPM), or a battery voltage). In addition to receiving the asset data 112, in some embodiments the asset interface 202 may also receive power from the asset 100 via the interface port 102. The interface layer 210 is coupled to the controller 230 and provides both the asset data 112 and the sensor data 205 to the controller 230.

The network interface 220 may include a cellular modem, such as an LTE-M modem, CAT-M modem, other cellular modem, Wi-Fi modem, or any other communication device configured for communication via the network 50 with which to communicate with the telematics server 130. The network interface 220 may be used to transmit telematics data 212 obtained from asset 100 to the telematics server 130 for a telematics service or other purposes. The network interface 220 may also be used to receive instructions from the telematics server 130 for configuring the telematics device 200 in a certain mode and/or requesting a particular type of the asset data 112 from the asset 100.

The NFC module 260 may be an NFC reader which can read information stored on an NFC tag. The NFC module 260 may be used to confirm the identity of the operator 10 by having the operator 10 tap an NFC tag onto the telematics device 200 such that the NFC tag is read by the NFC module 260. The information read from the NFC tag may be included in the telematics data 212 sent by the telematics device 200 to the telematics server 130.

The short-range wireless communications module 270 is a component intended for providing short-range wireless communication capability to the telematics device 200. The short-range wireless communications module 270 may be a Bluetooth™, wireless fidelity (Wi-Fi), Zigbee™, or any other short-range wireless communications module. The short-range wireless communications module 270 allows other devices to communicate with the telematics device 200 over a short-range wireless network.

The I/O expander port 250 allows the telematics device 200 to connect additional peripherals thereto for expanding the input/output capability thereof. This will be described further below with reference to FIG. 3.

The serial communications module 280 is an example of a wired communications module. The serial communications module 280 is an electronic peripheral for providing serial wired communications to the telematics device 200. For example, the serial communications module 280 may include a universal asynchronous receiver transmitter (UART) providing serial communications per the RS-232 protocol. Alternatively, the serial communications module 280 may be a serial peripheral interface (SPI) bus, or an inter-integrated circuit (I2C) bus. As another example, the serial communications module 280 may be a universal serial bus (USB) transceiver.

In operation, an ECU 110, such as the ECU 110A, the ECU 110B, or the ECU 110C communicates asset data over the CAN bus 104. The asset data exchanged between the ECUs 110, over the CAN bus 104 are accessible via the interface port 102 and may be retrieved as the asset data 112 by the telematics device 200. The controller 230 of the telematics device 200 receives the asset data 112 via the asset interface 202. The controller 230 may also receive sensor data 205 from the sensors 204 over the sensor interface 208. Furthermore, the controller 230 may receive location data 207 from the location module 206. The controller 230 combines the asset data 112 with the sensor data 205 and the location data 207 to obtain the telematics data 212. The controller 230 transmits the telematics data 212 to the telematics server 130 over the network 50 via the network interface 220. Optionally, an operator 10 may tap an NFC tag to the NFC module 260 to identify themself as the operator 10 of the asset 100. Additionally, an external peripheral, such as a GPS receiver, may connect with the telematics device 200 via the short-range wireless communications module 270 or the serial communications module 280 for providing location information thereto. In some embodiments, the telematics device 200 may receive, via the network interface 220, commands from the telematics server 130. The received commands instruct the telematics device 200 to be configured in a particular way. For example, the received commands may configure the way in which the telematics device gathers asset data 112 from the asset 100 as will be described in further detail below.

The telematics data 212 which is composed of asset data 112 gathered from the asset 100 combined with the sensor data 205 and the location data 207 may be used to derive useful data and analytics, by the telematics server 130. However, there are times when additional data, which is not provided by the asset 100, the sensors 204 or the location module 206 may be needed. The telematics device 200 may have a limited number of sensors 204 such as accelerometers or gyroscopes providing limited information about the motion of the asset 100 on which the telematics device 200 is deployed. The location module 206 may provide location and direction information. However, in some cases, more information may be needed to derive useful data and analytics pertaining to the asset 100. One example of information that is not typically provided by the telematics device 200 is video-capture data. Another example of information that is not typically provided by the telematics device 200 is any proprietary signaling provided by devices which does not follow any of the standard protocols (OBD-II, J1939 or CANOpen). Some equipment may not have a CAN bus and may provide proprietary digital and/or analog signals. Examples of such devices include industrial equipment, winter maintenance equipment such as salt spreaders, farming equipment, and the like. Additionally, the telematics device 200 may not have an NFC module 260 or a short-range wireless communications module 270 thus limiting its connectivity capabilities.

Input/Output Expander

Figure 3:
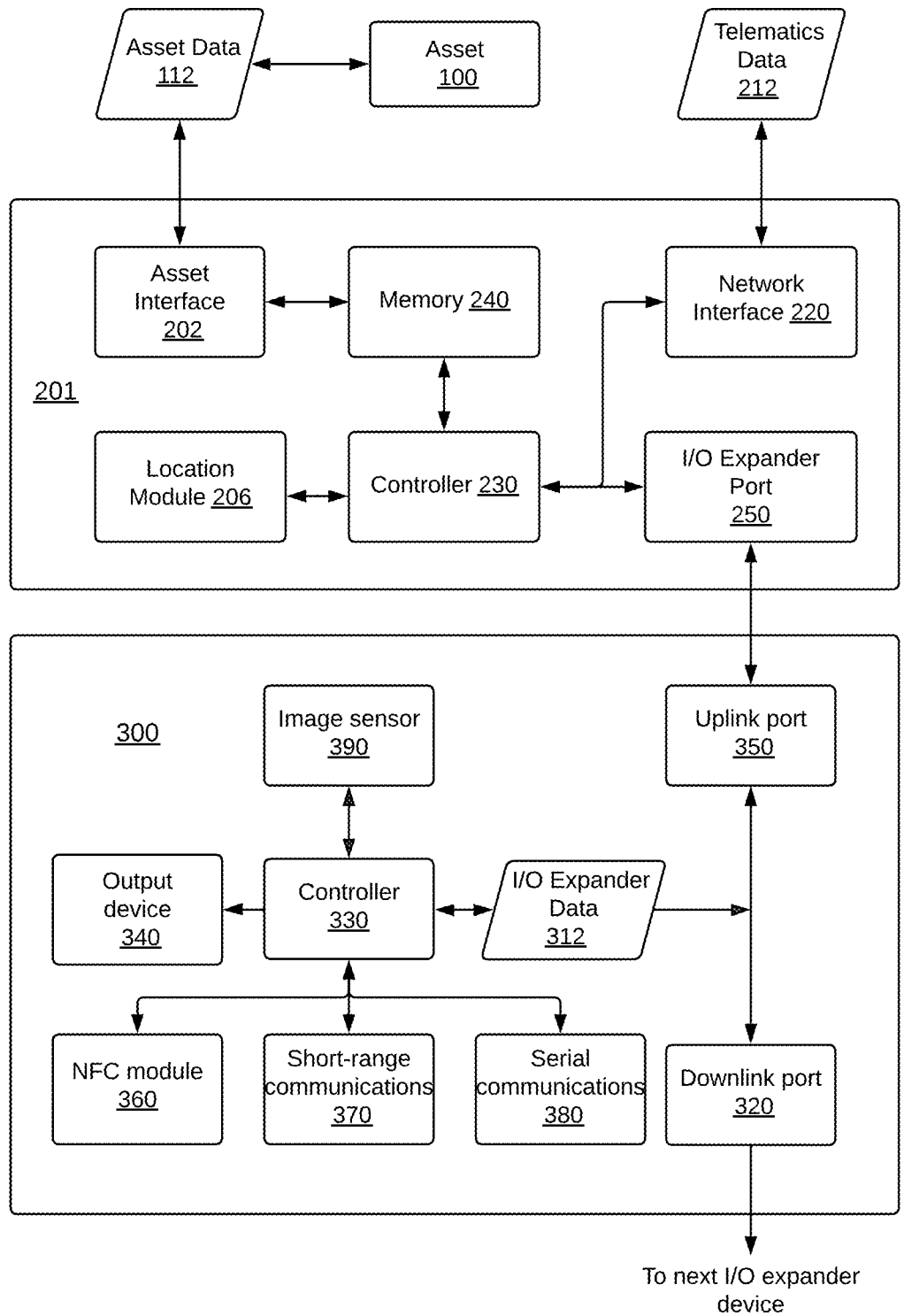
FIG. 3 is a block diagram showing a telematics device coupled to an asset and to an input/output (I/O) expander.

To capture and provide information or services not provided by the asset 100 or the telematics device, to produce an output, or to perform an action not supported by the telematics device, the telematics device 200 may be modified to allow an input/output expander device ("I/O expander") to connect thereto, as shown in FIG. 3. FIG. 3 shows a telematics device 201 coupled to an asset 100. An I/O expander 300 is coupled to the telematics device 201.

The asset 100 is similar to the asset 100 of FIG. 2 and therefore the internal components thereof are not shown in FIG. 3 for simplicity.

The telematics device 201 has a somewhat similar configuration as the telematics device 200 of FIG. 2, but some of the optional components have been removed. Furthermore, the telematics device 201 adds an I/O expander port 250 for interfacing with the I/O expander 300. The I/O expander port 250 is coupled to the controller 230 and may be configured for exchanging I/O expander data 312 with the I/O expander 300.

In some embodiments, the I/O expander port 250 uses the CAN protocol to communicate with an I/O expander 300. In other embodiments, the I/O expander port 250 uses the USB protocol.

An I/O expander is an electronic peripheral device, which provides additional capabilities to a telematics device when connected thereto. The additional capabilities may relate to capturing input data or generating output based on captured data. The I/O expander 300 of FIG. 3 is an example I/O expander which is designed to provide additional input and output options to a telematics device 200, which has more limited features than the one shown in FIG. 2. For example, the telematics device 201 shown in FIG. 3 does not have an NFC module, a short-range wireless communications module, or a serial communications module. Instead, the telematics device 201 has an I/O expander port 250 permitting the connection of an I/O expander that may provide such capabilities. The I/O expander 300 may be an input device configured to capture additional data such as video frames, audio frames, or proprietary signals and provide that data to the telematics device 201. Alternatively, or additionally, the I/O expander 300 may be configured as an output device and may include a display for displaying information and/or an audio output device for broadcasting messages pertaining to the asset 100.

An I/O expander 300, which connects with the telematics device 201, varies in complexity depending on the purpose thereof. FIG. 3 shows an I/O expander 300 containing several components which may or may not all be present in other I/O expanders. For example, the I/O expander 300 includes a controller 330, an NFC module 260, an output device 340, a short-range communications module 370, an image sensor 390, a serial communications module 380, an uplink port 350 and a downlink port 320.

The controller 330 may be similar to the controller 230 in FIG. 3. In some embodiments, the controller 330 is a microcontroller with versatile I/O capabilities. For example, the controller 330 may be a microcontroller which has a plurality of I/O ports such as general-purpose inputs and outputs (GPIOs), serial ports, analog inputs, and the like. In some embodiments, the controller 330 may have built-in persistent memory such as flash memory on which machine-executable programming instructions for conducting the functionality of the I/O expander 300 may be stored. In other embodiments, the controller 330 may be coupled to a persistent memory module (not shown) that contains the machine-executable programming instructions for conducting the functionality of the I/O expander 300. The controller 330 may also have built-in volatile memory, such as random-access memory (RAM) for storing data. Alternatively, the I/O expander 300 may be connected to an external volatile memory for storing data.

The output device 340 receives data from the controller 330 and performs an output function. For example, the output device 340 may include a display for displaying information received from the controller 330. As another example, the output device 340 may include a speech synthesizer and a speaker for displaying audible information received from the controller 330. As yet another example, the output device 340 may be an output interface to a hardware device. For example, the output device 340 may be a motor controller that interfaces to an electric motor.

The NFC module 360, short-range communications module 370, and the serial communications module 380 are similar to the NFC module 260, short-range wireless communications module 270, and the serial communications module 280 described above with reference to FIG. 2.

The image sensor 390 may be a digital still camera or a digital video camera capable of capturing images. For example, the image sensor 390 may be a road-facing dashboard camera for monitoring the road ahead. In other examples, the image sensor 390 may be a driver-facing dashboard camera for identifying the operator 10 and/or their condition.

The uplink port 350 is comprised of an electronic peripheral interface coupled to the controller 330 and a connector coupled to the electronic peripheral interface. The uplink port 350 is used to provide data exchange and/or power capabilities to the I/O expander 300. The uplink port 350 allows the I/O expander 300 to transmit and receive I/O expander data. The uplink port 350 is configured to use the same protocol and signaling as the I/O expander port 250 of the telematics device 201. Accordingly, the I/O expander 300 may exchange the I/O expander data 312 with the telematics device 201. In some embodiments, the uplink port 350 may also include power pins connected to corresponding power pins in the I/O expander port 250, thus allowing the I/O expander 300 to be powered via the telematics device 201. In other embodiments (not shown), the I/O expander 300 may have its own power source instead of or in addition to the power provided by the telematics device 201 via the uplink port 350.

Figure 7:
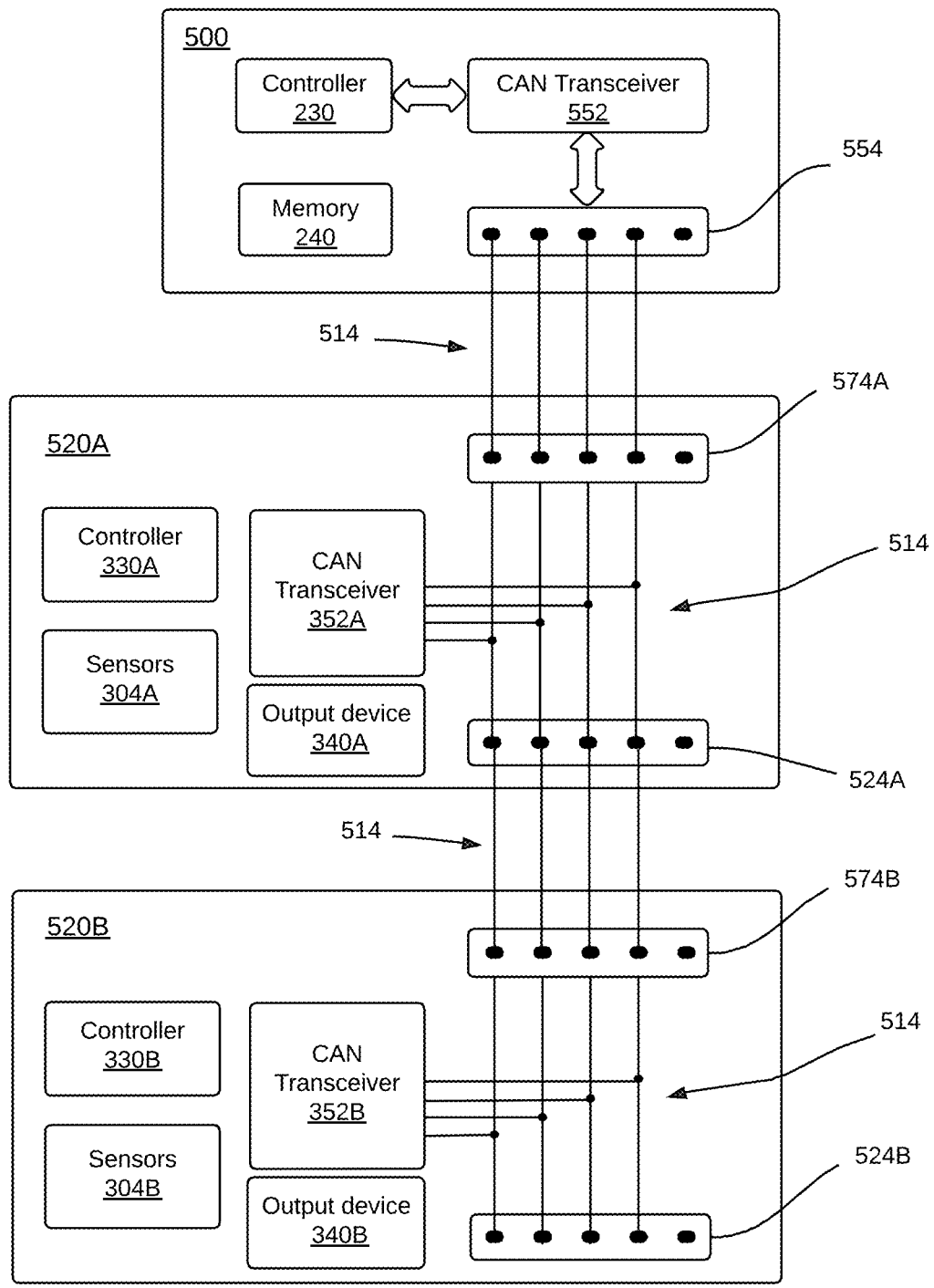
FIG. 7 is a block diagram depicting two I/O expanders in a daisy chain arrangement to a telematics device.

The downlink port 320 is comprised of an electronic peripheral interface and a connector, similar to the uplink port 350. In the depicted embodiment, the downlink port 320 is coupled to the uplink port 350. The downlink port 320 is configured to interface with the uplink port of another I/O expander (as will be described below). Allowing the downlink port 320 to connect to the uplink port of another I/O expander allows the conceptual daisy chaining of I/O expanders. In some implementations, the I/O expander port, the uplink port, and the downlink port use the CAN protocol. This will be discussed below with reference to FIG. 5 and FIG. 7.

Integrated Telematics Device

Figure 4:
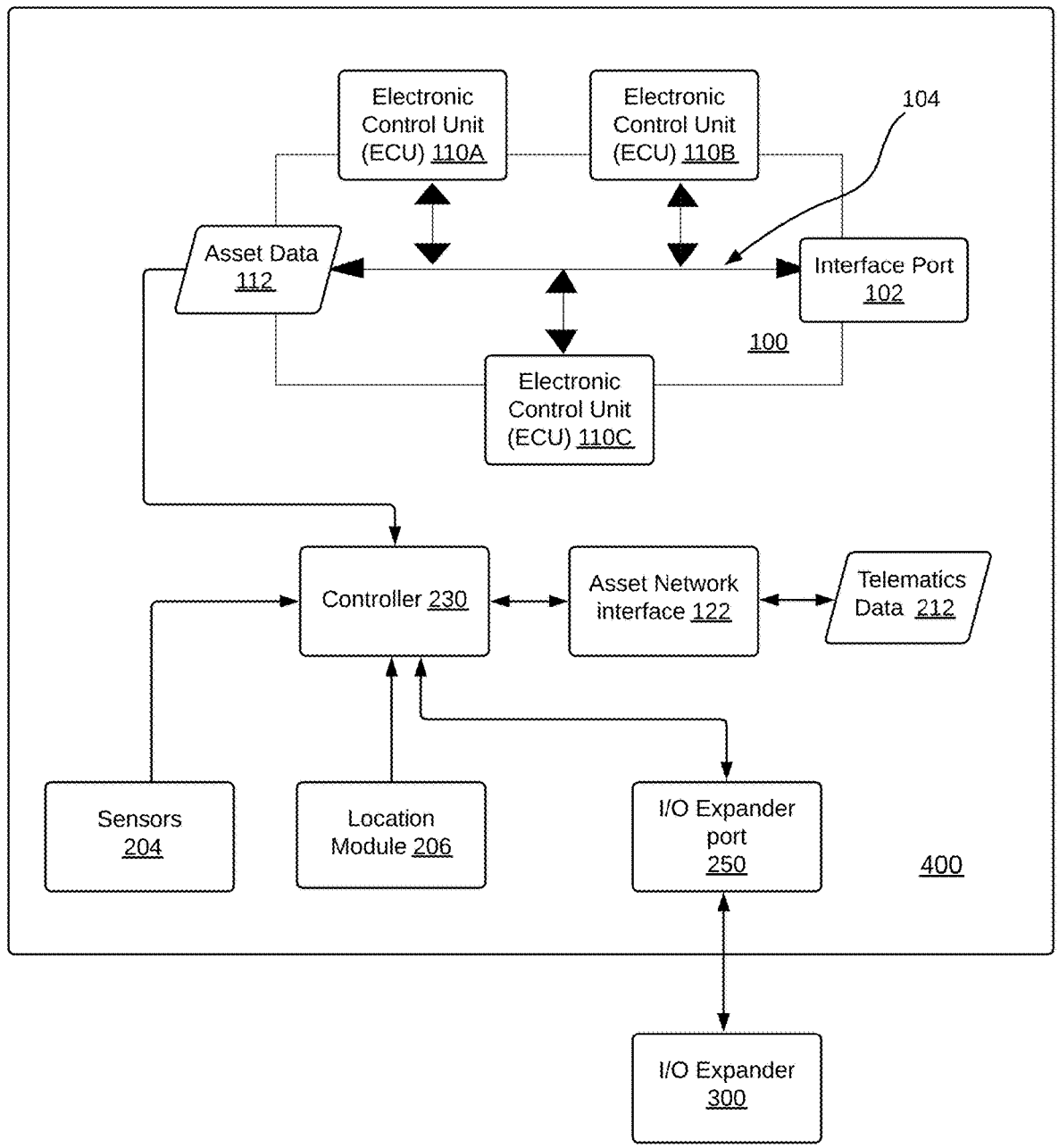
FIG. 4 is a block diagram showing an asset having a telematics device integrated therein and I/O expander coupled thereto.

In the above-mentioned figures, a telematics device is shown as a separate entity connected with a corresponding asset. The telematics device, however, may have the components thereof integrated into the asset 100 either at the time of manufacture of the asset 100 or retrofitted at a later time. This may be the case when the asset 100 is a connected car having an asset network interface. For example, with reference to FIG. 4, there is shown an asset 400 with the components of a telematics device integrated therein, in accordance with embodiments of the present disclosure. The asset 400 is similar to the asset 100 but, being a connected asset such as a connected car, it has an asset network interface 122. In the depicted embodiment, the controller 230 is directly connected to the asset communications bus, which is a CAN bus 104 and may directly obtain the asset data 112 therefrom. The sensors 204 and the location module 206 are also integrated into the asset 100 and provide the sensor data 205 and the location data 207 to the controller 230 as described above. The asset network interface 122 belongs to the asset 400 and may be used by the asset 400 to communicate with an original equipment manufacturer (OEM) server, to a roadside assistance server, or for other purposes. The controller 230 may utilize the asset network interface 122 for the transmission of telematics data 212 provided by the controller 230. In order to support further not provided by the integrated peripherals such as the sensors 204 and the location module 206, the asset has an I/O expander port 250 coupled to the controller 230 so that an I/O expander 300 may be connected to the asset 400 therethrough. The asset 400 may have an interface port 102 for connecting other devices other than a telematics device 200, such as a diagnostic tool including, but not limited to, an OBD-II reader device.

CAN I/O Expander Interfaces

Figure 5:
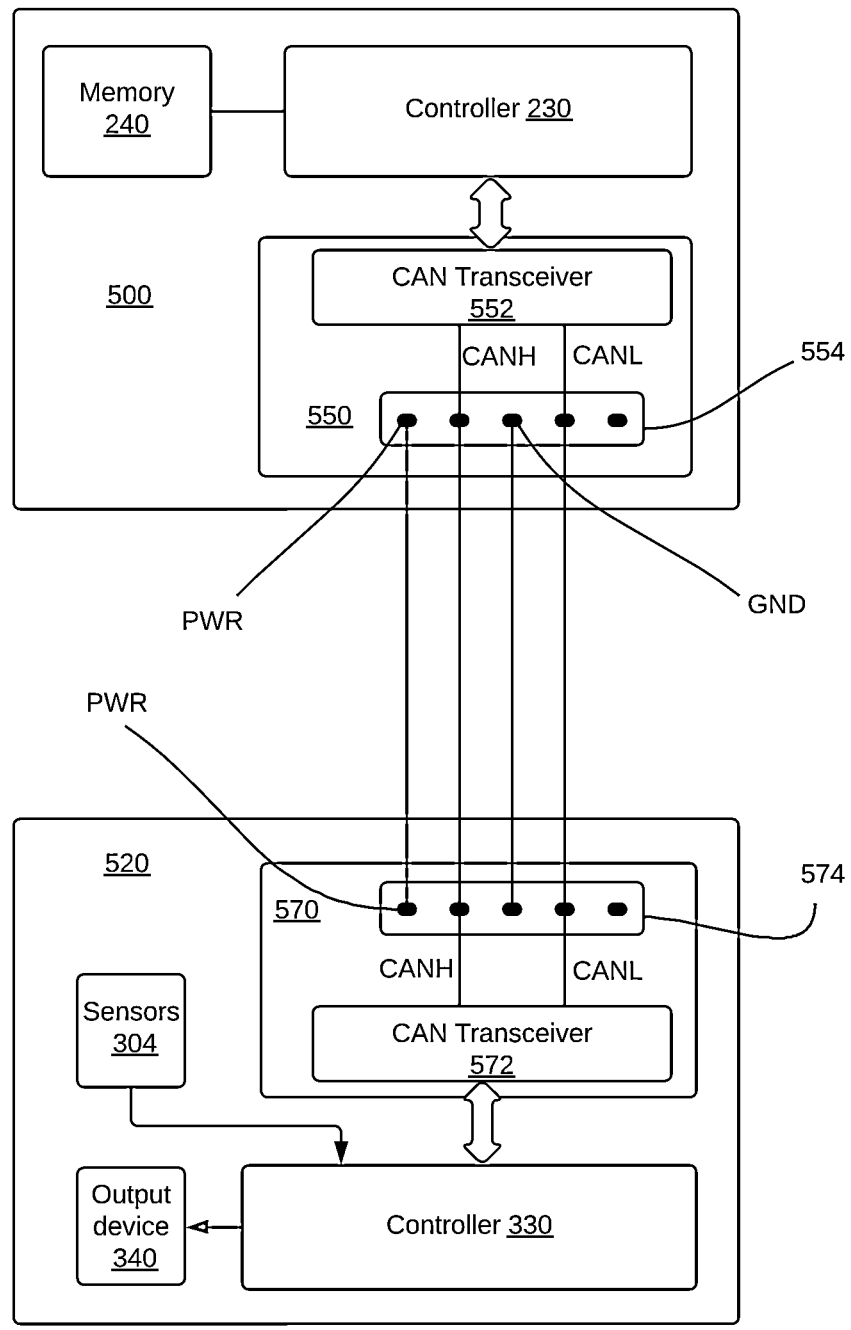
FIG. 5 is a block diagram depicting a connection between a telematics device and an I/O expander using the CAN protocol.

As discussed above, in some implementations the I/O expander port of a telematics device and the uplink port of an I/O expander may both use the CAN protocol. FIG. 5 depicts an implementation in which a telematics device 500 is connected to an I/O expander 520 via a CAN connection. Some components of the telematics device 500 and the I/O expander 520 are not shown for the sake of brevity. The I/O expander port of the telematics device 500 is a CAN port 550, which comprises a CAN transceiver 552 and a CAN port connector 554. Similarly, the uplink port of the I/O expander 520 is a CAN port 570 comprised of a CAN transceiver 572 and a CAN port connector 574. The I/O expander 520 contains a sensor 304 which represents many types of sensors that provide data. The I/O expander 520 also contains an output device 340 for producing an output from output expander data received from a telematics device. The I/O expander 520 may be directly connected to the telematics device 200 as shown or a cable/harness (not shown) may be used.

Figure 6:
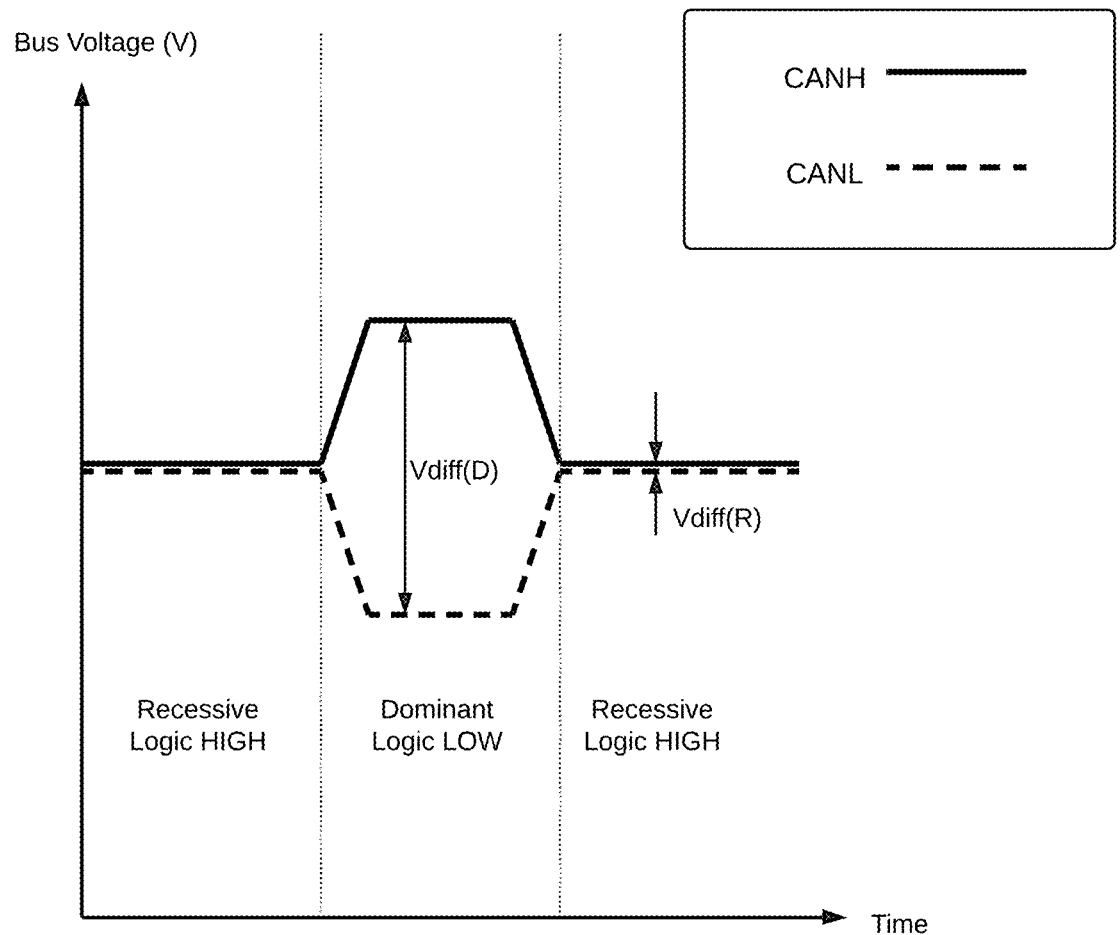
FIG. 6 is a graph showing the CAN protocol voltage levels for both the recessive logic and the dominant logic.

In operation as an input expander, the sensors 304 provide data to the controller 330 of the I/O expander 520. The controller 330 processes the sensor data and provides input/output expansion (IOX) data to the CAN transceiver 572 of the CAN port 570. The CAN transceiver 572 can perform a number of tasks. The CAN transceiver 572 may drive the signal lines that transmit the IOX data to the telematics device 200. Additionally, the CAN transceiver 572 may convert digital logic voltages to CAN bus voltages. CAN bus voltage levels are different from digital voltage levels used by the controller 330. As shown in FIG. 6, the CAN interface defines logic "0" as the dominant logic, and logic "1" as the recessive logic. In the dominant logic, the CANH signal is set to a voltage of 3.5V while the CANL signal is set to a voltage of 1.5V. In the recessive logic, the CANH and the CANL are both set to 2.5V. Digital logic voltages used by the controller 330 may be 0V for logic 0 and 5V for logic HIGH, or 0V for logic LOW and 3.3V for logic HIGH. The CAN transceiver 572 thus converts logic LOW and logic HIGH values which may be output on a general purpose I/O (GPIO) pin of the controller 330 to CAN voltage levels output on the signal lines labeled CANH and CANL. The CANH and CANL signals are sent over pins of the CAN port connector 574 to corresponding CANL and CANH pins of the CAN port connector 554 of the telematics device 200.

At the telematics device 500, the CANH and CANL signals are passed through the CAN port connector 554 to the CAN transceiver 552 where they are converted to digital voltage levels suitable for input to the controller 230, for example at a GPIO pin thereof.

The I/O expander 520 of FIG. 5 may also be an output expander, in which case the telematics device 500 sends data thereto for producing an output. In this case, the controller 230 of the telematics device 200 outputs the data, for example over a GPIO pin thereof to the CAN transceiver 552. The CAN transceiver 552 adjusts the voltage levels to the CANH and CANL levels and sends the data over the signal lines of the CAN port connector 554 to the pins of the CAN port connector 574 of the I/O expander 520. The CAN transceiver 572 converts the CAN voltage levels back to digital voltage levels and provides the data in digital voltage levels to the controller 330 where it may be sent to the output device 340.

In some embodiments, the I/O expander 520 and the telematics device 500 are connected using a Mini USB type B 5-Pin connector. For example, the CAN port connector 554 of the telematics device 500 may be a Mini USB type B ("Mini USB") receptacle and CAN port connector 574 of the I/O expander 520 may be a Mini USB plug.

In the implementation of FIG. 5, the telematics device 500 provides power and ground signals to the I/O expander 520. The power (PWR) signal pin on the CAN port connector 554 of the telematics device 500 is connected to a corresponding power signal pin on the CAN port connector 574 of the I/O expander 520 for providing power thereto. The ground (GND) pin on the CAN port connector 554 of the telematics device 500 is connected to a corresponding ground pin on the CAN port connector 574 of the I/O expander 520.

Connecting Multiple CAN I/O Expanders to One Another

The CAN bus architecture permits connecting I/O expanders to one another. For example, with reference to FIG. 7, there is shown a telematics device 500 connected to a first I/O expander 520A, which in turn is connected to a second I/O expander 520B. The first I/O expander 520A is shown to comprise a controller 330A, a CAN transceiver 352A, sensor 304A and an output device 340A. The first I/O expander 520A also has an uplink CAN port connector 574A and a downlink CAN port connector 524A. The second I/O expander 520B is shown to comprise a controller 330B, a CAN transceiver 352B, sensor 304B, and an output device 340B. The second I/O expander 520B also has an uplink CAN port connector 574B and a downlink CAN port connector 524B.

Specifically, the CAN port connector 554 of the telematics device is connected to the uplink CAN port connector 574A of the first I/O expander 520A. The downlink CAN port connector 524A of the first I/O expander 520A is connected to the uplink CAN port connector 574B of the second I/O expander 520B. Input/output expansion data from the second I/O expander 520B is passed through to the telematics device 500 via the downlink CAN port connector 524A and the uplink CAN port connector 574A.

The signal lines extending between the CAN port connector 554, the uplink CAN port connector 574A, the downlink CAN port connector 524A, the uplink CAN port connector 574B, and the downlink CAN port connector 524A comprise a CAN bus 514 which may sometimes be referred to as the I/O CAN bus of the external CAN bus. The CAN bus 514 is distinct from the CAN bus 104 that is local to the asset to which a telematics device is coupled. The CAN bus 514 is shared by the telematics device 500, the first I/O expander 520A, and the second I/O expander 520B.

Other Protocols for I/O Expanders

The aforementioned I/O expander system uses the CAN protocol for communication between the telematics device 500 and the I/O expander 520. Other technologies are contemplated. For example, another option is to use the Universal Serial Bus (USB).

Universal Serial Bus

The Universal Serial Bus (USB) is a common interface that enables communication between electronic devices and a host controller. USB may be used to connect peripheral electronic devices to a host electronic device. A host electronic device typically has a USB receptacle to which a peripheral USB device plugs. A peripheral USB device may contain a plug that plugs directly into the USB receptacle of the host electronic device. Alternatively a USB peripheral may plug into a USB host device by means of a USB cable.

In this disclosure, connectors are shown to have pins. The pins connect to "signal lines," which carry signals destined for other connectors or devices. The terms "pins" and "signal lines" may therefore be used interchangeably. A "signal" refers to an electrical signal traveling in a signal line. In the context of electronic circuit boards, a "signal line" refers to a wire or a connection on a printed circuit board (PCB). In the context of a microchip, the term "pin" refers to an external connection connecting the microchip internal circuitry to the outside world.

In this disclosure, the term "port" refers to a subsystem including a physical connector and all components, circuitry, and transceivers that facilitate the establishment of a connection and transmission of data over the connector. A USB port thus includes a connector, such as a plug or a receptacle, and other components for establishing a USB connection and exchanging data over the USB connection. In this disclosure when discussing signals on a port connector, the terms "pin" and "signal" may be used interchangeably, with the understanding that the pin is a physical element and the signal is the electrical signal passing through the pin.

For a host electronic device, the connector of a USB port is typically in the form of a receptacle. For a peripheral electronic device, the connector of the USB port is typically a plug. In some cases, a peripheral electronic device may also have a connector in the form of a receptacle. In this case, a USB cable is needed to connect the peripheral electronic device to the host electronic device. In this disclosure, references to a plug being connected to a receptacle should be understood to mean that the plug has been inserted into the receptacle and that corresponding pins of each of the plug and the receptacle have made electrical connections with one another.

In this disclosure, a "host electronic device" refers to an electronic device performing the main functionality of a system and accepts connections from one or more "peripheral electronic devices". A peripheral electronic device is an electronic device that performs input/output capability and transfers information to and from a host electronic device. In the context of USB technology, the term "host electronic device" refers to a device having a downstream facing port (DFP). Also in the context of USB technology the term "peripheral electronic device" refers to a device having an upstream facing port (UFP). This is explained further below. For brevity, the host electronic device may be referred to as the "host device", and the peripheral electronic device may be referred to as the "peripheral device".

A host device typically has a receptacle configured to receive a plug. The plug may be attached to another device or to a USB cable. For example, a laptop computer can act as a USB host electronic device with a receptacle. The receptacle may receive a plug from one end of a USB cable, or may receive a plug attached directly to a USB peripheral device such as a flash drive. Receptacles and plugs may both be considered "connectors".

USB Standard Evolution

Figure 8:
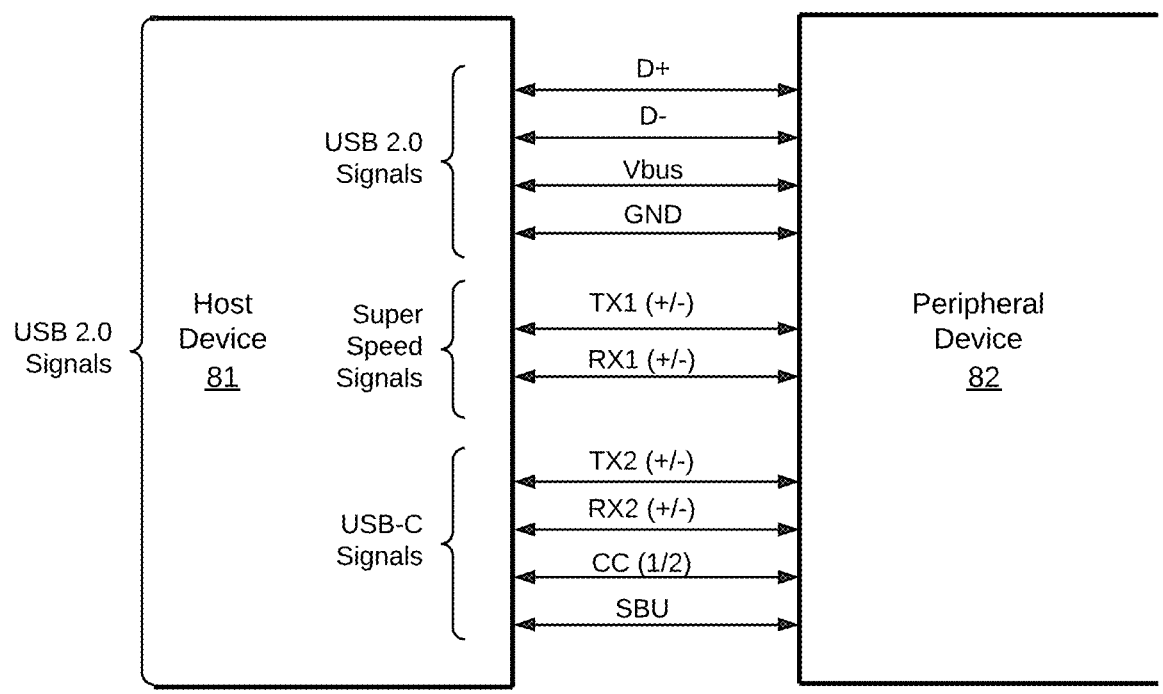
FIG. 8 is a block diagram showing USB signals between a host device and a peripheral device.

The USB standard has evolved over the years starting with USB 1.x in 1998, followed by USB 2.0 in 2000, USB 3.0 in 2008, USB 3.1 Gen 2 in 2013, and USB Type-C in 2014. USB Type-C ("USB-C") is a 24-bin USB connector system with a rotationally symmetrical connector. USB-C adds more signal lines over previous versions of USB. FIG. 8 shows a USB host device 81, and a USB peripheral device 82 connected to the USB host device 81 via a USB-C connection. FIG. 8 shows that up to USB 2.0, a USB connector had only four signals (labeled "USB 2.0 Signals") namely Vbus (power), GND (ground), D+, and D−. USB devices up to USB 2.0 use differential voltage between the differential pair signals D+/D−. For example, a logic "1" is specified by D+ having a logic HIGH while D− has a logic LOW. Conversely, a logic "0" is specified by having D− having a logic HIGH while D+ has a logic LOW. In USB technology, a HIGH is 2.8V and a LOW is −0.3V. The voltage of Vbus is 5V by default, however, the standard allows USB devices to negotiate Vbus voltage values other than the default.

The USB 3.0 standard has added more signals namely the superspeed channel comprised of the differential pair superspeed signals TX1+/TX1− and RX1+/RX1−. The superspeed channel is capable of data transfer rates of up to 4.8 Gbits/s (or 600 MB/s), which is ten times the speed of USB 2.0, which was 480 Mbits/s (or 60 MB/s). The USB 3.0 superspeed signals are labeled "Super Speed Signals" in FIG. 8.

USB-C

The USB-C has added more signals to USB 3.0 signals, labeled as "USB-C" signals in FIG. 8. Among the newly added USB-C signals, is a second superspeed channel comprised of the differential pair superspeed signals TX2+/TX2− and RX2+/RX2−. USB-C also adds a configuration channel CC for cable attach detection, cable orientation detection, role detection, and current mode detection. Additionally, USB-C has added sideband use (SBU) signals for use in alternate mode, as will be described below.

A USB-C plug can be inserted into a USB-C receptacle in any one of two orientations and still works the same way. This is accomplished through redundancies of pins in the port receptacle and plug. FIG. 9A shows a USB-C receptacle pinout, while FIG. 9B shows a USB-C plug pinout. As can be seen the VBUS (cable bus power) pins are symmetrically duplicated. As whether the plug is in a first orientation with respect to the receptacle or in a second orientation with respect to the receptacle, the 4th pin from the left and the 4th pin from the right is always VBUS. Similarly, the GND (cable ground) pins are symmetrically duplicated such that the GND pin is always the first pin on the left and the first pin on the right no matter what the orientation of the connector is. The USB 2.0 D+/D− pins are in the center of the connector and are mirrored such that the functionality thereof is maintained irrespective of the connector plug orientation. The configuration channels CC1 and CC2 pins are used for cable attachment detection, orientation detection, role detection, and current mode. One of CC1 and CC2 carries the signal VCONN to supply power for cable or adapter. The signals SBU1 and SBU2 are sideband use signals, and are used for alternate mode. The Superspeed Channel 1 and Superspeed Channel 2 are swapped when the plug is rotated with respect to the receptacle (i.e., switching from a first orientation to a second orientation, or vice versa). It is therefore important to know the orientation of the plug with respect to the receptacle.

Host Mode, Device Mode, and Dual Role

A USB-C port may be used in one of three modes. The first mode is "host mode" which is used by a USB host electronic device. A USB-C port that supports host mode is termed a downstream facing port (DFP). A USB host device provides power to a USB peripheral device. In other words, a USB-C port configured as a DFP is configured to provide power. The second mode for a USB-C interface is "device mode". Device mode is used by a USB peripheral device. A USB-C port that supports device mode is an upstream facing port (UFP). A USB-C port that supports device mode does not provide power to another USB device connected thereto. Dual-role mode USB-C ports can be a UFP or a DFP. A USB-C port that supports dual mode role is a dual-role port (DRP).

Connector Orientation Detection and VBUS Current Limit

As discussed above, the relative orientation between two USB connectors (namely a receptacle and a plug) needs to be known in order for a USB host electronic device to know which superspeed channel to use for data transfer.

Figures 10A, 10B:
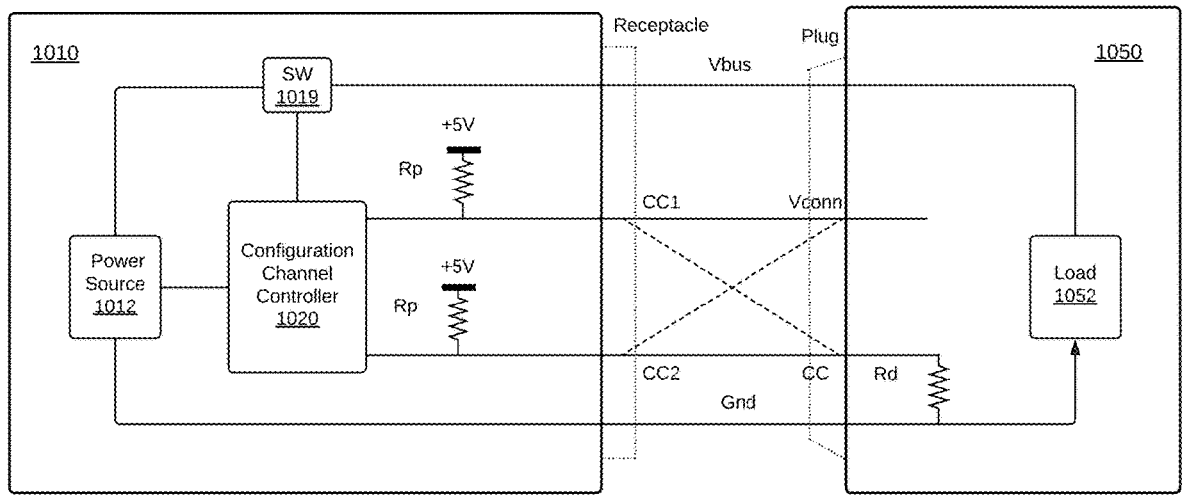
FIG. 10A is a diagram depicting a downlink facing port (DFP) of a host device connected with an uplink facing port (UFP) of a peripheral device.
FIG. 10B is a table showing the bus current limit for various pull-up resistor values of the DFP of FIG. 10A.

FIG. 10A depicts an exemplary system comprised of a USB-port of a host electronic device configured as a DFP 1010 connected to a USB-C port of a peripheral device configured as a UFP 1050.

The DFP 1010 includes a power source 1012, a CCC 1020, a switch 1019, and two pull-up resistors Rp. The power source provides power to Vbus, when the switch 1019 is turned on. The CCC 1020 performs a number of tasks. For example, the CCC 1020 may turn the switch 1019 on to enable power delivery, when needed. The CCC 1020 also determines the voltage at the configuration channel pins CC1 and CC2 to determine the orientation of a plug plugged into the receptacle of the host device, and determines the amount of power delivery that the DFP 1010 delivers by default. The switch 1019 may be a Field Effect Transistor that can be enabled by the CCC to connect power from the power source 1012 to the bus power line Vbus.

The UFP 1050 has a load 1052 between the Vbus signal and the ground representing the circuitry of the peripheral device. One CC pin of the plug of the UFP 1050 is connected to the signal Vconn while the other CC pin thereof is connected to the ground (Gnd) via a pull-down resistor Rd.

In the depicted example, the plug of the UFP1050 is connected to the receptacle of the DFP 1010 in a first orientation such that the Vconn signal of the plug is connected to CC1 of the receptacle, while the CC pin of the plug is connected to CC2 of the receptacle. These two connections are represented by straight solid lines between CC1 (on the DFP 1010) and Vconn (on the UFP 1050) and between CC2 (on the DFP 1010) and CC (on the UFP 1050). As a result of the shown connection, CC1 is driven high by Vconn. Conversely, CC2 is pulled to a lower voltage as current flows from the 5V supply through the lower Rp resistor and the Rd resistor to the Gnd. The lower voltage of CC2 is determined by the values of the resistors Rp and Rd. As shown in the table depicted in FIG. 10B, when Rp is 10K and Rd is 5.1K the voltage on CC2 is approximately 1.7V. The CCC 1020 determines that the UFP 1050 is connected to the DFP 1010 in a first orientation since CC1 is at a high voltage while CC2 is at a low voltage.

If the plug of the UFP 1050 is flipped such that Vconn is connected to CC2 and CC is connected to CC1 (as shown in dotted lines), then the inverse of what has been described above takes place. In other words, CC2 is driven high and CC1 is driven low. Accordingly, the CCC 1020 determines that the UFP 1050 is connected to the DFP 1010 in a second orientation since CC2 is at a high voltage while CC1 is at low voltage.

The values of the resistors Rp and Rd determine the Vbus current limit to which Vbus can be driven. As shown in FIG. 10B, Vbus can be driven to deliver 500 mA or 900 mA when Rp is 56K, 1.5 A @ 5 V when Rp is 22 K, and 3.0 A @5V when Rp is 10K. For example, when the UFP 1050 is in the first orientation with respect to the DFP 1010, the CCC 1020 may measure the voltage at CC2 by using an analog-to-digital converter (ADC). Since the resistors Rp and Rd act as a voltage divider, the voltage at CC2 varies with different values of Rp. Accordingly, the CCC 1020 is able to determine the default current that the DFP 1010 needs to deliver to the UFP 1050 via Vbus. As a result, the CCC 1020 may configure the power source 1012 to provide the required default current, and enable the switch 1019 to deliver the power to the DFP.

USB Power Delivery

As shown in FIG. 10B, USB-C can deliver up to 3 A of current at 5 V. However USB charging has evolved and a new specification known as USB Power Delivery (USB PD) enables the maximum functionality of USB by providing more flexible power delivery along with data over a single cable. A recent revision of the USB PD specification (USB PD 3.1) can deliver up to 240 W of power. Earlier versions (prior to 2021) can deliver up to 100 W based on 20 V over USB-C cables rated at 5 A. Power delivery in excess of 3 A of current at 5 V is negotiated between a DFP and a UFP via messages exchanged over the configuration channel.

Configuration Channel

Figure 11:
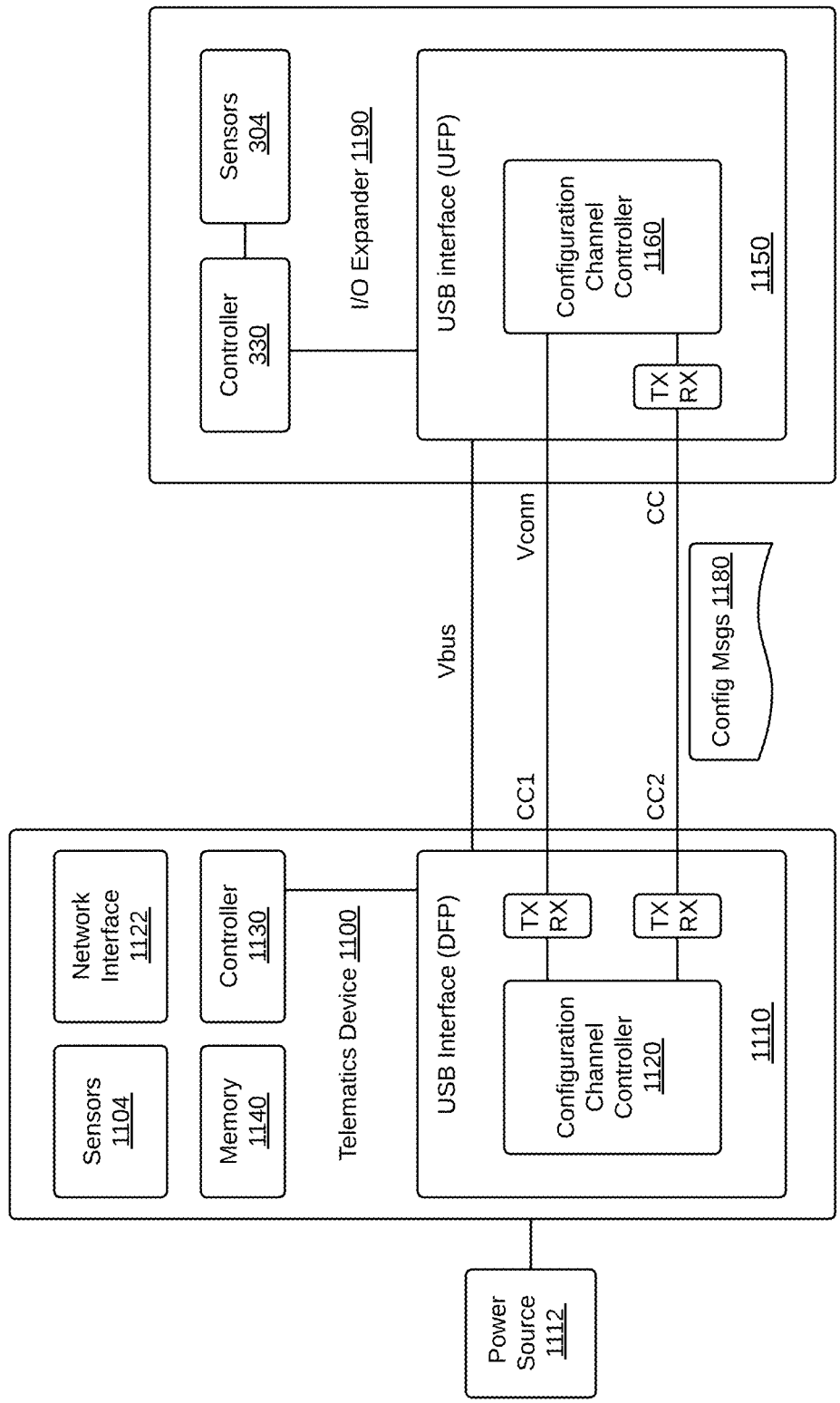
FIG. 11 is a diagram depicting an I/O expander connected with a telematics device over a USB interface and exchanging configuration messages therebetween.

The configuration channel of a USB-C port has been discussed briefly above. The signals CC1 and CC2 can be used to determine whether a USB-C plug has been plugged into a USB-C receptacle, determine the orientation of the plug with respect to the receptacle, and determine the default power that a DFP needs to provide to a UFP via the Vbus power line. The configuration channel has additional capabilities. The CCC of a DFP can exchange configuration messages with the CCC of a UFP, for example. The configuration messages may include a negotiation between the DFP and the UFP on the amount of power that the DFP delivers to the UFP which is in excess of the default values discussed above (which are determined by the value of the pull-up resistor of the DFP). The configuration messages may also include the enablement of USB-C alternate mode. The USB-C alternate mode specification allows for protocols other than USB to be transferred over a USB connection. For example, a UFP may indicate to a DFP that the UFP uses an alternate protocol to USB and may specify various parameters related to that protocol. In response, the UFP's CCC configures the UFP to use alternate mode pins to communicate with the DFP. This is explained in further FIG. 11 depicts a system in which an I/O expander 1190 connects to a telematics device 1100 via a USB-C connection. The I/O expander 1190 has a USB-C interface configured as a UFP 1150. The telematics device 1110 has a USB-C interface configured as a DFP 1110. In the depicted embodiment, the UFP 1150 is connected directly to the DFP 1110. In other embodiments (not shown) the UFP 1150 may connect to the DFP 1110 via a USB-C cable.

The telematics device 1100 is shown in simplified form where only the controller 1130, memory 1140, the sensors 1104, the network interface 1122, and the USB interface configured as the DFP 1110 are shown. However, other components such as a location module may also be present and are not shown so as not to clutter the figure. The controller 1130 and the memory 1140 are similar to the controller 230 and the memory 240 discussed above. The sensors 1104 are similar to the sensors 204. The network interface 1122 is similar to the network interface 220. The memory 1140 stores machine-executable programming instructions which configure the host electronic device to carry out the methods of the present disclosure.

The telematics device 1100 draws power from a power source 1112. For a vehicle telematics device, the power source 1112 may be the vehicle battery. The DFP 1110 is similar to the DFP 1010. The pull-up resistors (Rp) have been removed for brevity but are nevertheless present in the UFP 1150. Other circuitry such as the switch 1019 that routes power to Vbus is also not shown for brevity but is nevertheless present in the DFP 1110 for routing power to Vbus from the power source 1112.

The I/O expander 1190 is shown in simplified form containing only a controller 330, sensors 304, and the UFP 1150. The controller 330 and sensor 304 have been discussed above. The UFP 1150 is similar to the UFP 1050 but adds a peripheral configuration channel controller 1160 similar to the host CCC 1120. The UFP 1150 also contains a pull-down resistor Rd and a load, but they are not shown for simplicity.

FIG. 11 emphasizes the message exchange capability of the control channels. For example, in the depicted embodiment, the UFP 1150 has one configuration channel with transmit and receive capability. The DFP 1190 has two configuration channels, but only CC2 is used. As can be seen CC2 is connected to the CC pin of the UFP 1150, whereas CC1 is just connected to the signal Vconn. If the orientation of the UFP plug is reversed, then Vconn connects to CC2 and the DFP 1110 uses CC1 to connect to the CC of the UFP 1150.

When the UFP 1150 is connected to the DFP 1110, the host CCC 1120 detects the connection and determines the orientation of the UFP plug with respect to the DFP receptacle, as discussed above. The host CCC 1120 also determines the default power that the DFP 1110 is to deliver to the UFP 1150 based on the values of the resistor Rp (discussed above, but not shown in FIG. 11 for simplicity).

If the UFP 1150 requires more power than the default power, the peripheral configuration channel controller 1160 of the UFP 1150 sends a configuration channel message 1180 to the host CCC 1120 of the DFP 1110 requesting more power. If the host CCC 1120 determines that the power source 1112 can deliver the requested power, then the host CCC 1120 responds to the configuration channel message 1180 confirming that the requested power will be delivered. The host CCC 1120 then configures the power source 1112 to deliver the requested power to Vbus.

Another possible use of the configuration channel is to exchange messages that enable alternate mode, which is discussed below.

Alternate Mode (Alt Mode)

USB-C defines an alternate mode in which protocols other than USB may be transferred over a USB connection. Protocols such as DisplayPort, HDMI, MHL, and Thunderbolt may be sent over a USB-C port. Enabling a particular mode may be accomplished through the use of configuration messages between configuration channel controllers. For example, the peripheral configuration channel controller 1160 of the UFP 1150 may send a configuration channel message 1180 indicating to the DFP 1110 that the UFP wishes to communicate with the DFP using a requested alternate protocol other than USB. The host CCC 1120 determines whether the requested alternate protocol is supported. In some implementations, the configuration channel message specifies the USB-C alternate mode signals used by the peripheral electronic device connected to the host electronic device. The host CCC 1120 extracts the USB-C alternate mode signals from the configuration channel message 1180 to determine which USB-C alternate mode signals shall contain the data sent by the peripheral electronic device. In response to determining that the particular alternate protocol is supported, the host CCC 1120 enables the alternate mode for using the alternate protocol and sends a response configuration channel message confirming the enablement of the alternate mode that uses the requested alternate protocol. Enabling the alternate mode may comprise routing the alternate protocol signals to an interface module (or transceiver) for adjusting voltage levels, for example.

CAN in Alternate Mode

The USB-C alternate mode may be used to enable a host electronic device to support communications with a peripheral device such as an I/O expander using the CAN protocol. Additionally, the host electronic device may also communicate with a peripheral device that uses USB.

Figure 12A:
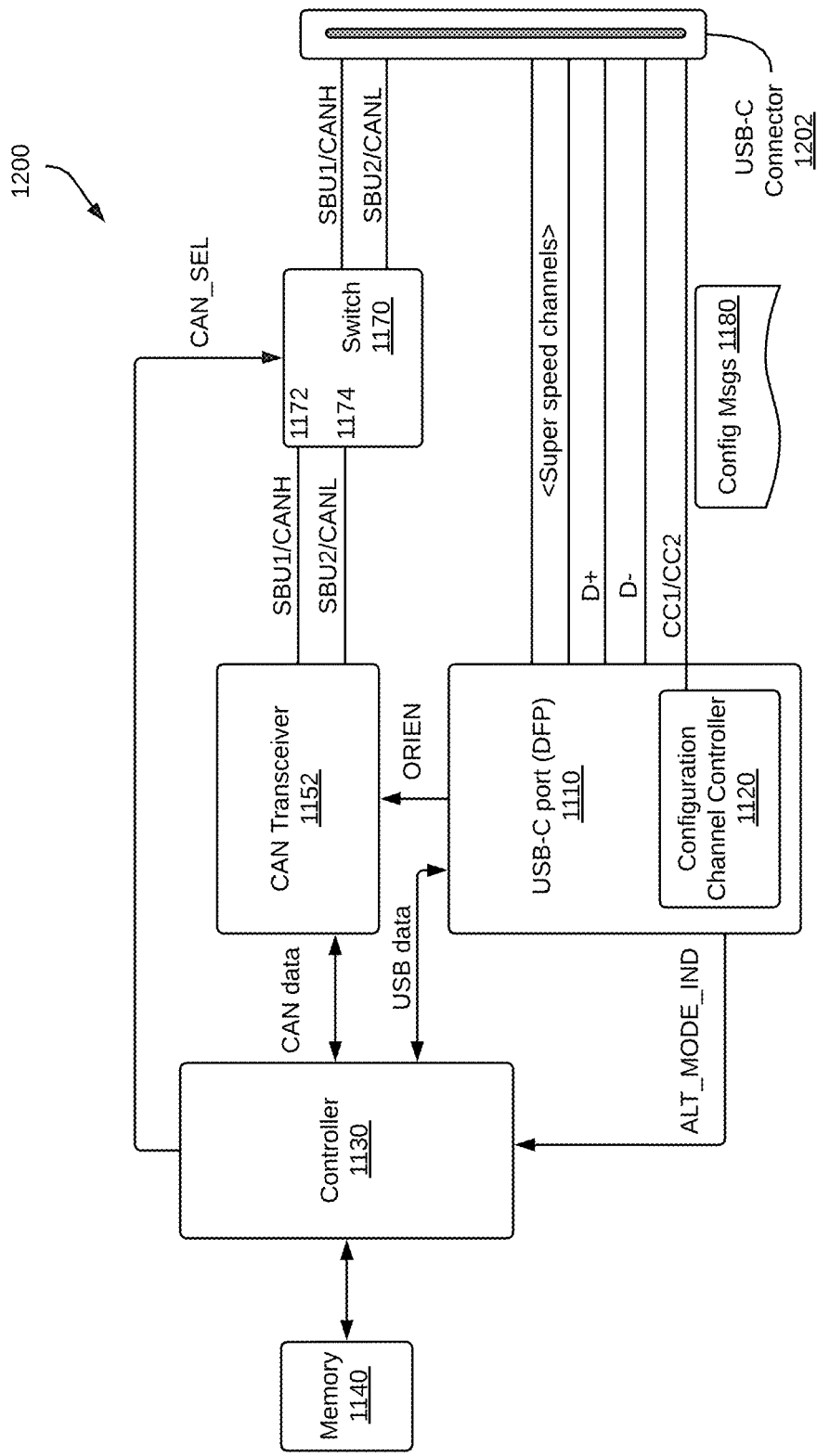
FIG. 12A depicts a host device that accepts connections from USB peripheral device and from CAN peripheral devices using USB-C alternate mode, in accordance with some embodiments of the present disclosure.

FIG. 12A depicts a simplified block diagram of a host electronic device 1200 that supports communication with peripheral devices using either USB or CAN, in accordance with embodiments of the present disclosure.

The host electronic device 1200 comprises a controller 1130, memory 1140, a USB interface including a host CCC 1120, a CAN transceiver 1152, a DFP 1110, and a switch 1170. The host electronic device 1200 has a host device connector in the form of USB-C connector 1202.

An example of the host electronic device 1200 is a telematics device, such as the telematics device 200.

The controller 1130 and the memory 1140 are similar to the controller 230 and the memory 240, respectively.

The CAN transceiver 1152 is similar to the CAN transceiver 552.

The switch 1170 allows passing some signals from the USB connector, namely sideband use USB signals, to the CAN transceiver 1152 based on a selection signal, CAN_SEL. Specifically, the switch 1170 passes the signals SBU1 and SBU2 to the CAN transceiver 1152 when the selection signal indicates CAN mode.

The USB connector connects the configuration channel signals CC1/CC2 to the host CCC 1120 of the DFP 1110. The USB connector also connects USB 2.0 and the super speed channel signals to the DFP 1110. The USB 2.0 signals are depicted in FIG. 8 and comprise the signals D+, D−, Vbus, and GND. FIG. 12A shows only D+/D− for brevity. USB signals that may be used for CAN alternate mode are connected to the CAN transceiver 1152 via the switch 1170.

When a peripheral electronic device is connected with the host electronic device 1200, the typical processes discussed above with reference to FIG. 10 and FIG. 11 take place at first. For example, the DFP 1110 of the host electronic device 1200 determines that the peripheral device is connected, determines the orientation of the connector of the peripheral device with respect to the orientation of the connector of the host electronic device, and determines the default Vbus current that the host electronic device is to deliver to the peripheral electronic device.

Subsequent to the initial processes discussed above, the peripheral electronic device sends configuration channel messages 1180 to the host CCC 1120 of the host electronic device 1200. For example, the peripheral device may request more electric power delivery current from the DFP 1110 of the host electronic device 1200.

During the initial processes discussed above, the signal CAN_SEL is de-asserted and as such the switch 1170 is off. When the switch 1170 is off, the switch pin 1172 and the switch pin 1174, that carry the SBU1/CANH and SBU2/CANL signals to the CAN transceiver are floating (i.e., are in a high impedance state). Consequently, the sideband use signals are not connected to the CAN transceiver. An example of the switch 1170 is a tristate buffer that passes signals therethrough when an enable signal is asserted. When the enable signal is de-asserted, the output pins of the tristate buffer are in high impedance mode.

In the depicted embodiment of FIG. 12A, the peripheral device connects to the USB-C connector 1202 and is either a USB device or a CAN device. When the peripheral device is a CAN device, the peripheral device sends the signals CANH and CANL over the sideband-use signals SBU1 and SBU2. When the peripheral device uses the USB 2.0 protocol, then in the depicted embodiments, the peripheral device exchanges data with the DFP 1110 of the host electronic device 1200 over the signals D+/D−. When the peripheral device uses USB 3.0 or higher, then the peripheral device exchanges data with the DFP 1110 over superspeed channel signals.

When the peripheral device uses the CAN protocol, the peripheral configuration channel controller of the UFP of the peripheral device sends a configuration channel message 1180 indicating to the host CCC 1120 that the peripheral device wishes to communicate with the host device using the CAN protocol over USB-C alternate mode. The host CCC 1120 configures the DFP 1110 to use alternate mode. Additionally, the host CCC 1120 asserts the alternate mode indicator signal ALT_MODE_IND. In response to the assertion of the ALT_MODE_IND, the controller 1130 determines that the host device will use the CAN protocol to communicate with the peripheral device. The controller 1130 asserts the CAN select signal (CAN_SEL) which is connected to the switch 1170. When the CAN_SEL is asserted, the switch 1170 passes the signals SBU1 (carrying CANH) and SBU2 (carrying CANL) to the CAN transceiver 1152. The CAN transceiver 1152 converts the signals to CAN data in digital voltage levels suitable for consumption by the controller 1130. The controller 1130 may also send CAN data to the CAN transceiver 1152. The CAN transceiver 1152 converts the CAN data to CAN signal levels (FIG. 7) and sends the CAN signals on the SBU1/CANH and SBU2/CANl signal lines. The switch 1170 passes the SBU1 and SBU2 signal lines to the USB connector.

When the peripheral device uses USB 2.0 to communicate with the host electronic device 1200, no configuration messages are sent to the host CCC 1120 and communication proceeds between the peripheral device and the host device over the D+/D− lines. In this case, the switch pin 1172 and the switch pin 1174 of the switch 1170 default to the high impedance mode on the SBU1 and SBU2 pins connected to the CAN transceiver 1152.

When the peripheral device uses USB 3.0 or higher to communicate with the host electronic device 1200, the configuration channel messages 1180 indicate that the peripheral device uses USB 3.0. The host CCC 1120 de-asserts the alternate mode indicator signal ALT_MODE_IND. The controller 1130 determines, from the alternate mode indicator, that the host device will use USB to communicate with the peripheral device. In response, the controller 1130 de-asserts the CAN selection signal CAN_SEL. In response to the CAN selection signal being de-asserted, the switch 1170 configures the switch pin 1172 (which carries the signal SBU1/CANH) and the switch pin 1174 (which carries the signal SBU2/CANL) in high impedance mode.

Advantageously, the host electronic device 1200 can accept connections from both a USB peripheral device and a CAN peripheral device that uses USB-C alternate mode.

The embodiment depicted in FIG. 12A comprises the host CCC 1120 notifying the controller 330 of alternate mode using CAN using the alternate mode indicator signal ALT_MODE_IND and the controller 330 configuring the switch 1170 to pass the sideband-use signal lines (which are carrying the CAN signals) by enabling the CAN select (CAN_SEL) signal. In an alternate embodiment, the alternate mode indicator signal ALT_MODE_IND may be directly connected to the switch 1170. For example, with reference to FIG. 12B, the alternate mode indicator signal ALT_MODE_IND is used as the CAN select CAN_SEL signal used to enable the switch 1170 to pass the sideband-use signals (used to carry CAN signals) from the USB connector to the CAN transceiver 1152. When alternate mode is not enabled, the CAN selection signal is de-asserted and the switch 1170 places the switch pin 1172 and the switch pin 1174 thereof that connect the sideband-use signals SBU1/CANH and SBU2/CANL to the CAN transceiver in high impedance (or tristate) mode.

Orientation Handling

While new CAN peripheral devices may be designed to use a connector that can only fit in a single orientation, a USB-C connector can have two orientations with respect to another USB-C connector. Turning back to FIG. 9A and FIG. 9B, it can be seen that the signals SBU1 and SBU2 are swapped when a USB plug's orientation with respect to a USB receptacle is changed from a first orientation to a second orientation. Accordingly, in a host device that uses a swappable receptacle such as a USB-C receptacle, a mechanism needs to be added to ensure that the CAN transceiver accounts for the reversal in polarity between a first orientation and a second orientation in which the CANH signals and CANL are swapped. A CAN transceiver with a polarity control module is known. Such CAN transceivers include an input signal that identifies the polarity of the CAN signal lines. One example of such CAN transceivers is the TCAN4420 from Texas Instruments™. In both FIG. 12A and FIG. 12B, the USB-C port (i.e., the DFP 1110) provides an orientation indication (ORIEN) to the CAN interface module. The orientation indication is set by the host CCC 1120 after determining the orientation as described above. The CAN transceiver 1152 swaps the signals CANH and CANL based on the orientation indication. Accordingly, the CANH and CANL signals are always in the proper order and the CAN transceiver 1152 is able to convert the CAN signals to digital signals readable by the controller 1130. For example, the CAN transceiver 1152 may pass through the signals SBU1 and SBU2 if the ORIEN signal is "0", and swap the signals SBU1 and SBU2 if the ORIEN signal is "1".

Method by Host Electronic Device

Figure 18:
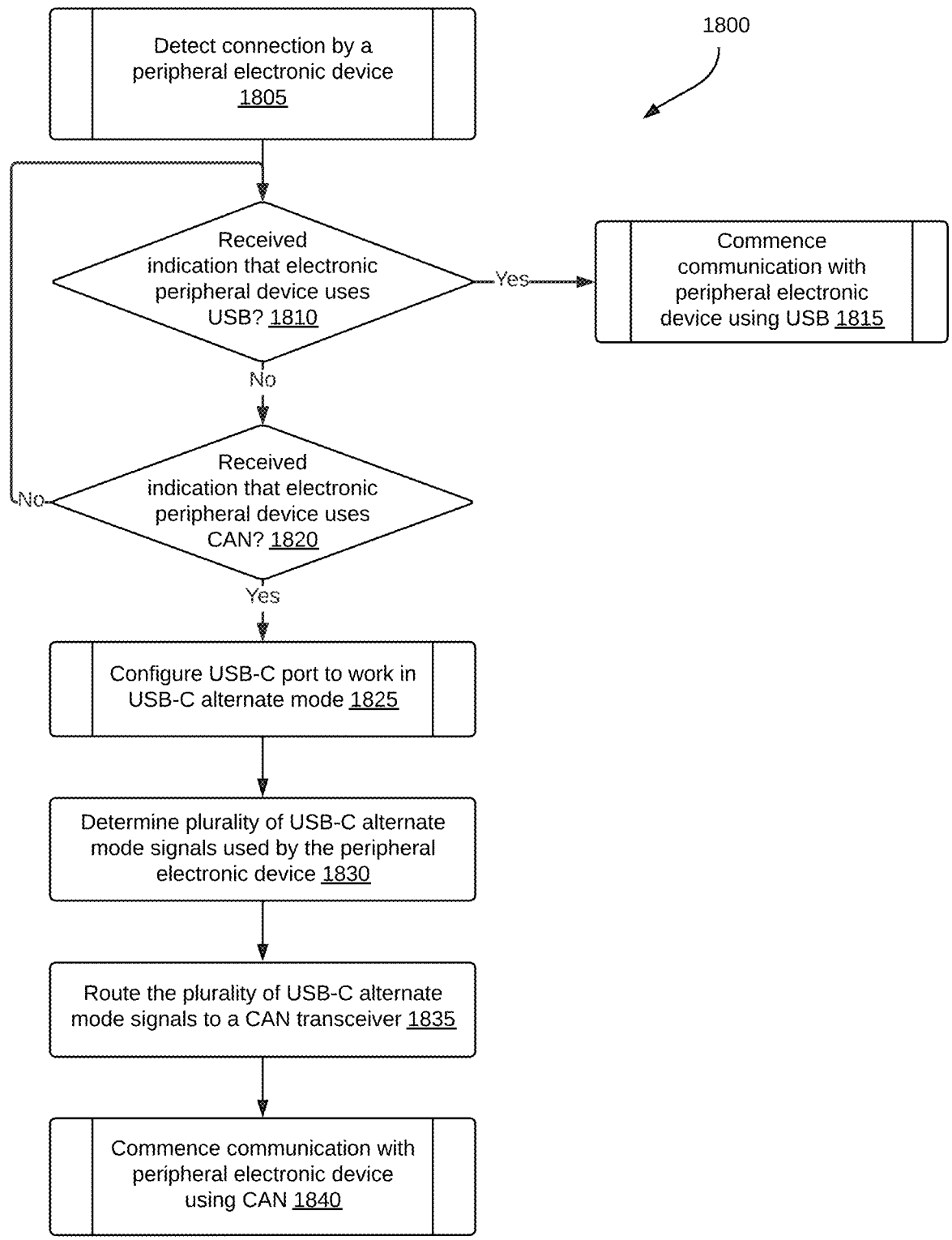
FIG. 18 is a flowchart depicting a method by a host electronic device, in accordance with embodiments of the present disclosure.

FIG. 18 depicts a method 1800 by a host electronic device, in accordance with embodiments of the present disclosure. The method begins at step 1805.

At step 1805, the host electronic device detects a connection by a peripheral electronic device. As discussed with reference to FIG. 10A, the DFP 1010 detects the connection of a UFP 1050 by measuring the voltage on the signals CC1 and CC2. A lower voltage on CC2 for the depicted embodiment of FIG. 10A indicates the presence of a UFP connected to the DFP 1010.

At step 1810, the host electronic device checks whether it has received an indication that the electronic peripheral device connected thereto uses USB. The indication may be in the form of a configuration channel message. If the indication is received, control goes to step 1815. Otherwise, control goes to step 1820.

At step 1815, the host electronic device commences communication with the peripheral electronic device using USB.

At step 1820, the host electronic device checks whether it has received an indication that the electronic peripheral device uses the CAN protocol. If yes, control goes to step 1825. Otherwise, control goes back to step 1810.

At step 1825, the host electronic device configures the USB-C port to work in USB-C alternate mode.

At step 1830, the host electronic device determines a plurality of USB-C alternate mode signals used by the peripheral electronic device. For example, the peripheral electronic device may use the SBU1 and SBU2 alternate mode signals for the CAN signals. In some implementations, the USB-C alternate mode signals used by the peripheral electronic device are specified in a configuration channel message sent by the peripheral electronic device to the host electronic device.

At step 1835, the host electronic device passes the USB-C alternate mode signals used by the peripheral electronic device to a CAN transceiver. For example, the host electronic device configures the switch 1170 to pass the sideband use signals SBU1 and SBU2 to the CAN transceiver 1152.

At step 1840, the host electronic device commences communication with the peripheral electronic device using CAN.

Peripheral Device Using CAN in Alternate USB-C Mode

Figure 12B:
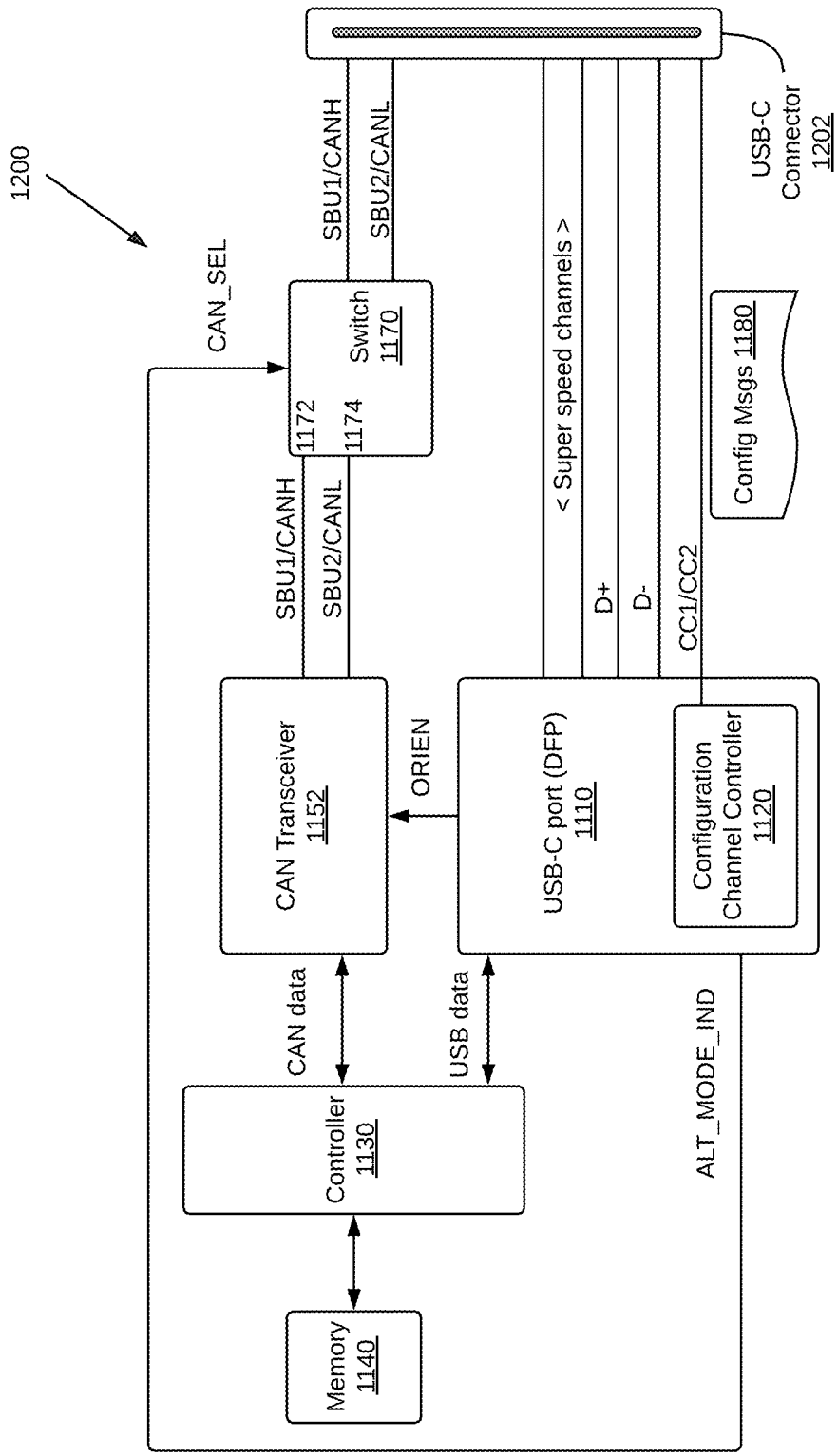
FIG. 12B depicts a host device that accepts connections from USB peripheral device and from CAN peripheral devices using USB-C alternate mode, in accordance with other embodiments of the present disclosure.
Figure 13:
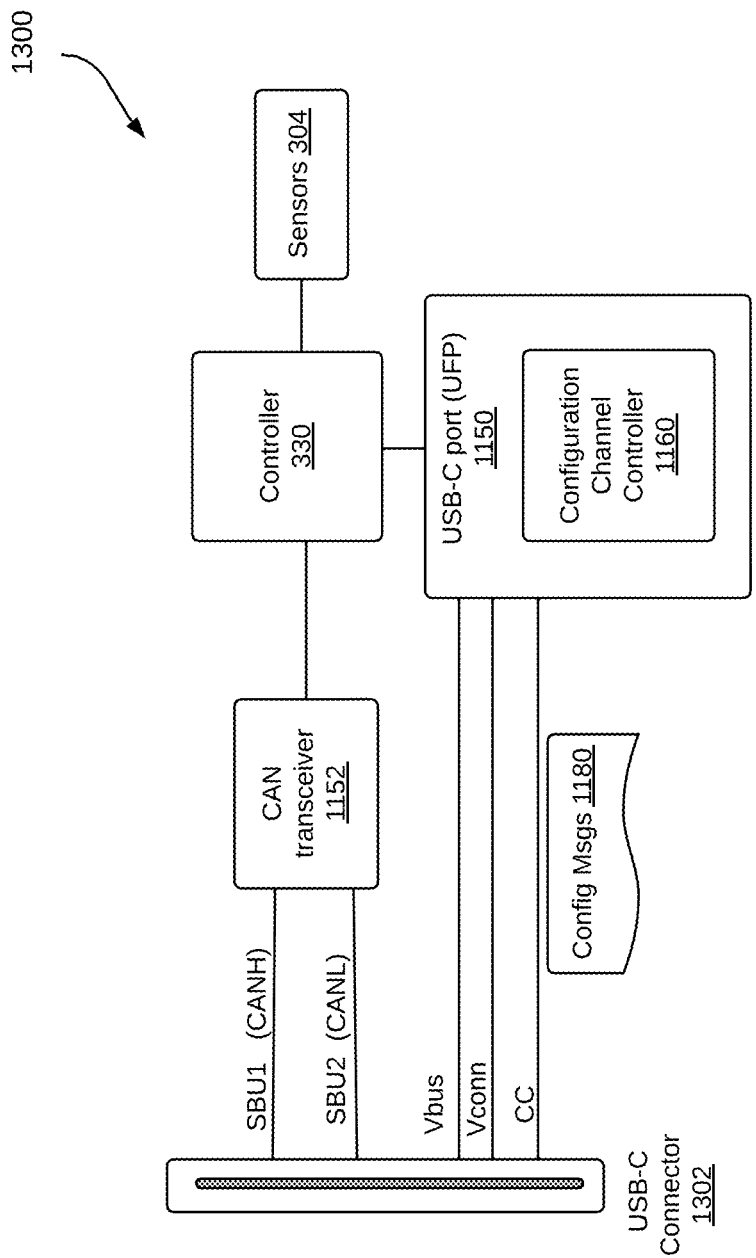
FIG. 13 depicts components of a peripheral device that uses the CAN protocol over USB-C alternate mode, in accordance with embodiments of the present disclosure.

A peripheral device 1300 configured to use the CAN protocol to communicate with the host electronic device 1200 of FIG. 12A or FIG. 12B is shown in FIG. 13. The peripheral device 1300 has a controller 1130, a USB-C port configured as a UFP 1150, sensors 304, a CAN transceiver 1152, and a peripheral device connector in the form of USB-C connector 1302. The UFP 1150 includes a peripheral configuration channel controller 1160. Other components of the UFP 1150, such as those shown for the UFP 1050 as shown in FIG. 10 are also part of the peripheral device 1300 but are not shown for brevity.

When the peripheral device 1300 is connected with the host electronic device 1200 of FIG. 12A or FIG. 12B, the initial procedures relating to USB enumeration are first carried out between the host device and the peripheral device 1300. Specifically, the host device detects the connection with the peripheral device 1300, detects the orientation of the peripheral device USB-C connector in relation to the host electronic device connector, and determines the power requirements. Subsequently, the peripheral configuration channel controller 1160 sends a configuration message to the host CCC 1120 of the host electronic device 1200 indicating that the peripheral device 1300 uses USB-C alternate mode to send CAN data. Subsequent to receiving a confirmation configuration message from the host CCC 1120, the peripheral configuration channel controller 1160 notifies the controller 330 that both the peripheral device 1300 and the host electronic device 1200 are now in USB-C alternate mode. In response to receiving the confirmation configuration message, the controller 330 commences sending data provided by the sensors 304 to the CAN transceiver 1152. The CAN transceiver 1152 sends the data as CAN data to the host electronic device 1200 via the USB connector. The CAN transceiver 1152 adjusts the signal levels of the data from the controller 330 and sends the resulting CANH and CANL signals over the sideband-use signals SBU1 and SBU2 of the USB-C connector of the peripheral device 1300.

Interface Converter

While new CAN peripheral devices may be designed with a built-in USB-C port including a peripheral configuration channel controller 1160 as shown in FIG. 13, other CAN peripheral devices, such as the I/O expander 300 of FIG. 5 only have a CAN interface. A peripheral device, such as the I/O expander 300 does not have a USB-C port or a configuration channel controller for establishing a CAN connection with a host device using USB-C alternate mode. In another aspect of the present disclosure, there is provided an interface converter that enables connecting a CAN peripheral device to a host electronic device that supports CAN over USB-C alternate mode.

Figure 14:
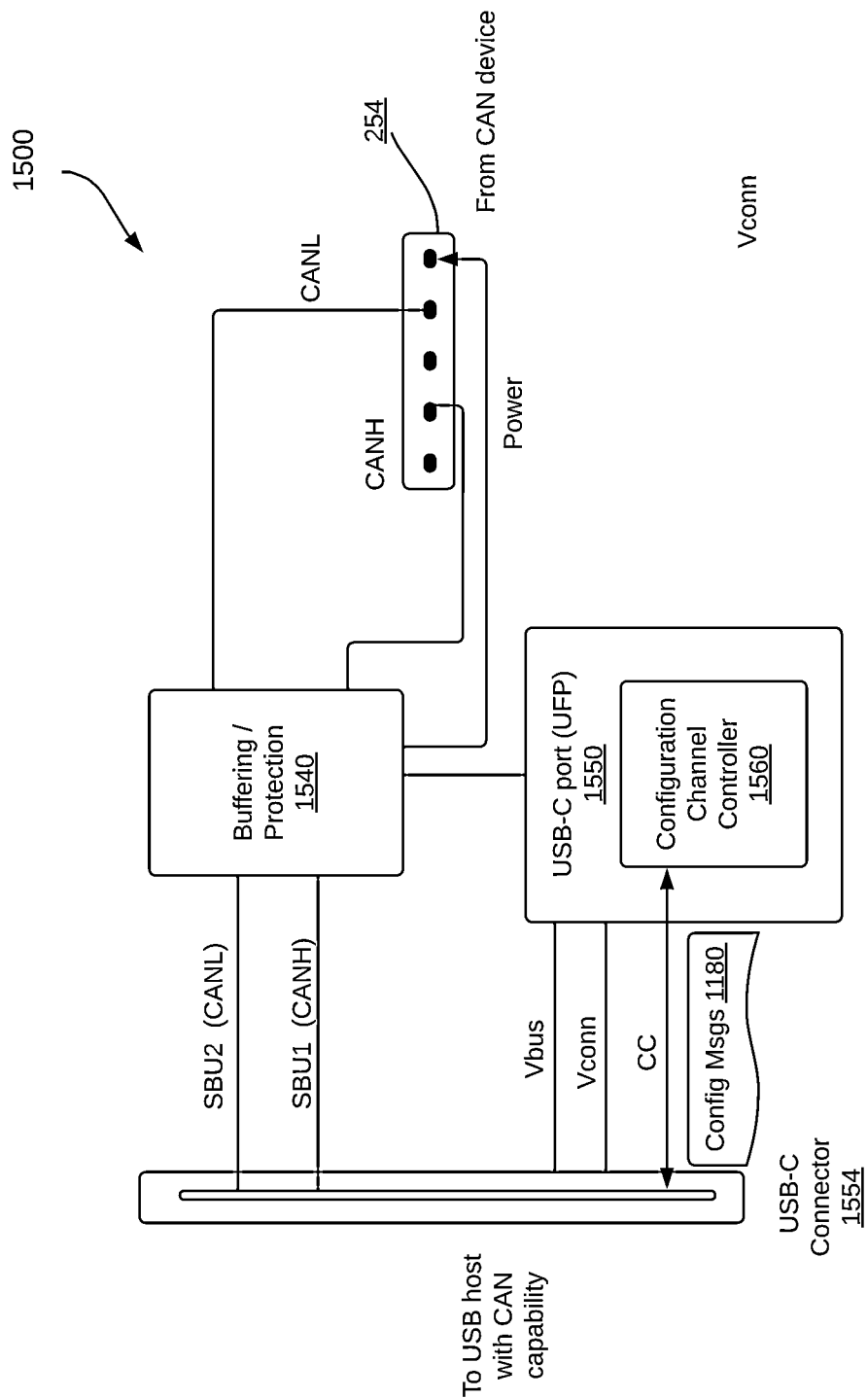
FIG. 14 depicts an interface converter for interfacing a CAN peripheral device to a host device that supports the CAN protocol over USB-C alternate mode, in accordance with embodiments of the present disclosure.

An interface converter 1500, in accordance with embodiments of the present disclosure is depicted in FIG. 14. In its simplest form, the interface converter 1500 has a CAN interface connector 254 to which a CAN peripheral device may connect. The interface converter 1500 has a buffering/protection module 1540 that controls routing the CAN signals CANH and CANL to a USB-C connector for connecting to a host device. The interface converter 1500 also has a USB-C port configured as a UFP 1550 and including a configuration channel controller 1560. The configuration channel controller 1560 negotiates with a host device configuration channel controller and requests a USB-C alternate mode connection for use by a CAN device. While not shown, the interface converter may also have a resistance Rd similar to that shown in the UFP 1050.

In operation, a CAN peripheral device is plugged into the CAN interface connector 254. The interface converter 1500 is then connected to a host electronic device via the USB-C connector 1554. The host electronic device detects the connection of the interface converter 1500 thereto. The host electronic device also detects the orientation of the USB-C connector 1554 relative to the USB connector of the host device. The UFP 1550 indicates the default power that the interface converter 1500 expects the DFP of the host device to provide. The configuration channel controller of the host device communicates with the configuration channel controller 1560 of the interface converter 1500, for example to negotiate power delivery options. The configuration channel controller 1560 of the interface converter indicates to the configuration channel controller of the host device that the interface converter represents a CAN device that uses USB-C alternate mode. Both configuration channel controllers negotiate a USB-C alternate mode connection. The configuration channel controller indicates to the buffering/protection module 1540 that the USB-C alternate mode connection has been established thus enabling the buffering/protection module 1540 to route the CANH and CANL signals to the SBU1 and SBU2 signals of the USB-C alternate mode.

Advantageously, with the use of the interface converter, a CAN peripheral device may connect to a host electronic device that supports routing CAN in USB-C alternate mode over the sideband use signal lines. No changes to the CAN peripheral device are necessary when the interface converter 1500 is used. Accordingly, the cost of a CAN peripheral device is kept low. If a peripheral device uses the USB protocol, the peripheral device may connect directly to the host device without the need for the interface converter. The interface converter also offers backward compatibility for CAN-only peripheral devices.

Automatic Detection of CAN-Only Peripheral Device

In yet another aspect of the present disclosure, there is provided an impedance-based method and device for automatic detection of a CAN-only peripheral device connected to a host electronic device.

In some cases, a CAN peripheral electronic device does not contain any USB circuitry to negotiate a USB-C alternate mode with a host electronic device such that CAN traffic can travel over USB-C alternate mode signals. One solution discussed above is the use of an interface converter. Another approach that does not require the use of an interface converter involves the host electronic device accepting either CAN or USB signals over a single USB-C connector, and determining which protocol is being used by a peripheral device connected to the host device by means of checking impedance/resistance levels. For example, when the plug of a peripheral electronic device is inserted into a receptacle of a host electronic device, the host electronic device first checks whether the peripheral electronic device uses the USB protocol. The peripheral device may use the USB pins D+/D− if it uses the USB protocol 2.0. Alternatively, the peripheral device may use other pins, such as the sideband use pins SBU1 and SBU2 to route CAN traffic. In the case where the peripheral device uses the CAN protocol, the USB 2.0 pins D+/D− are not used and are considered open circuit from the host device perspective. Accordingly, in some embodiments, by checking the voltage at the D+/D− pins, a host device determines whether the peripheral device is using USB or another protocol. To illustrate, reference is made to FIG. 15A and FIG. 15B.

Figure 15A:
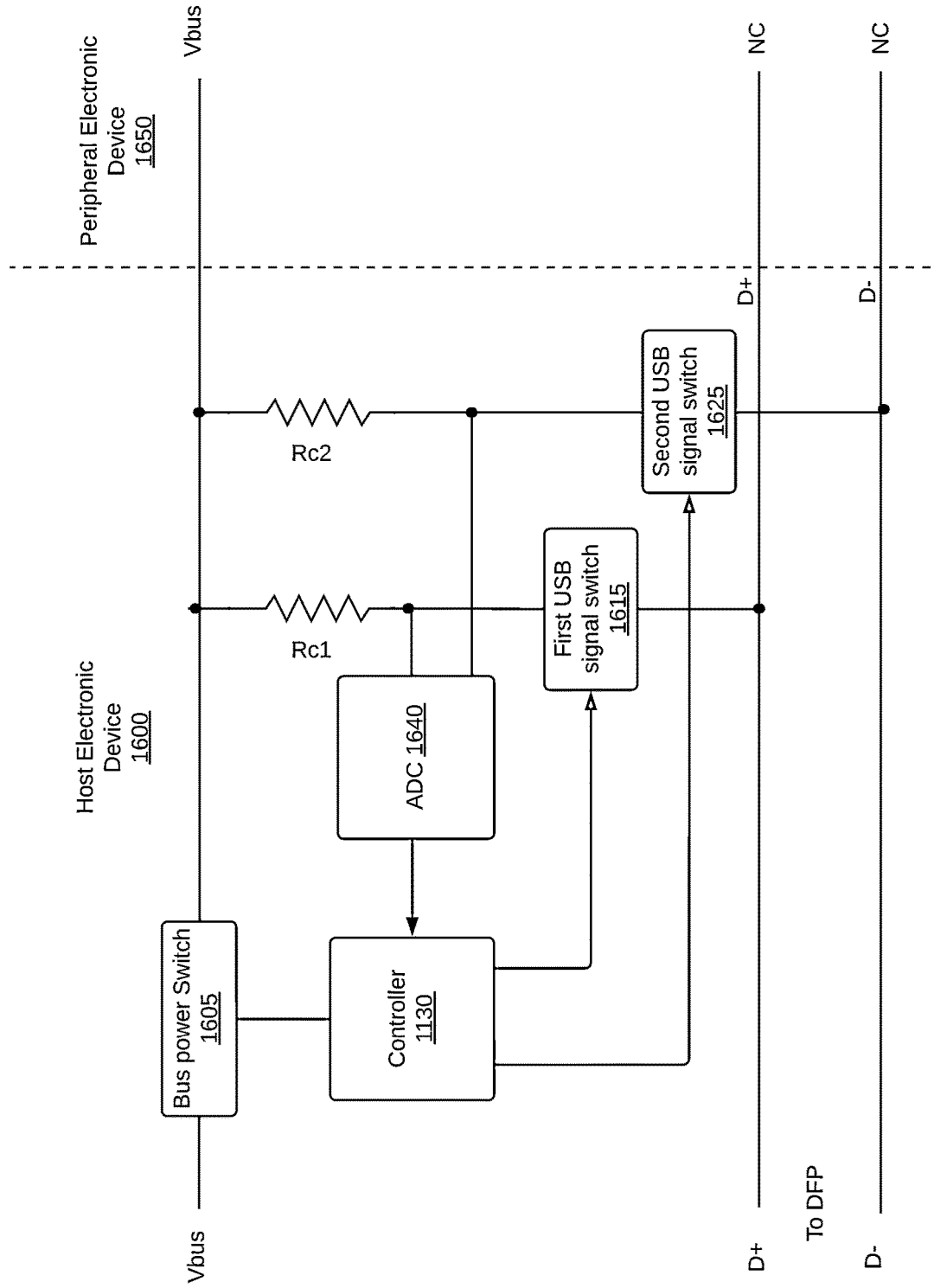
FIG. 15A depicts a host device subsystem for detecting whether a USB device is connected to the host device, the subsystem shown in connected to a CAN peripheral device.
Figure 15A:
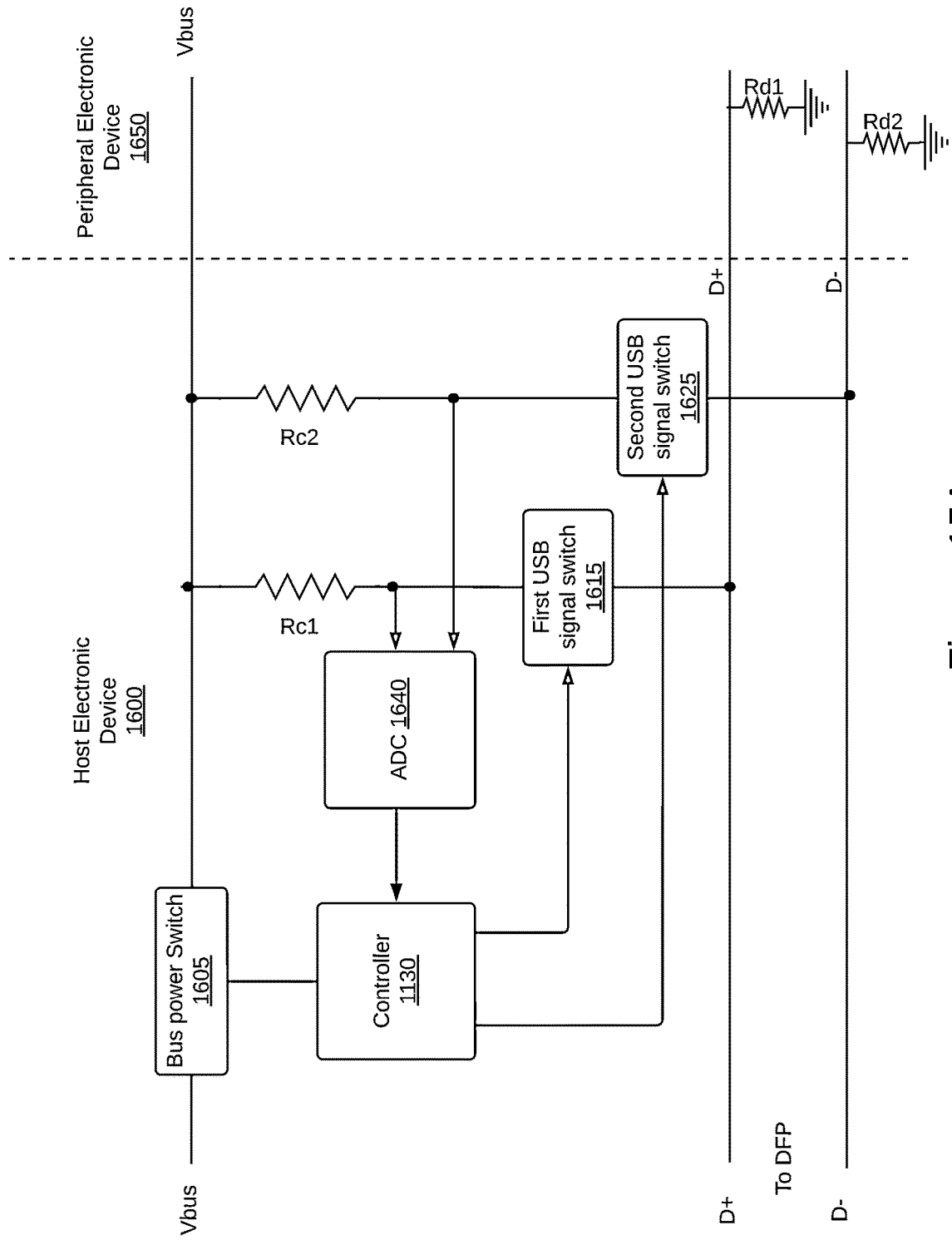
Figure 17:
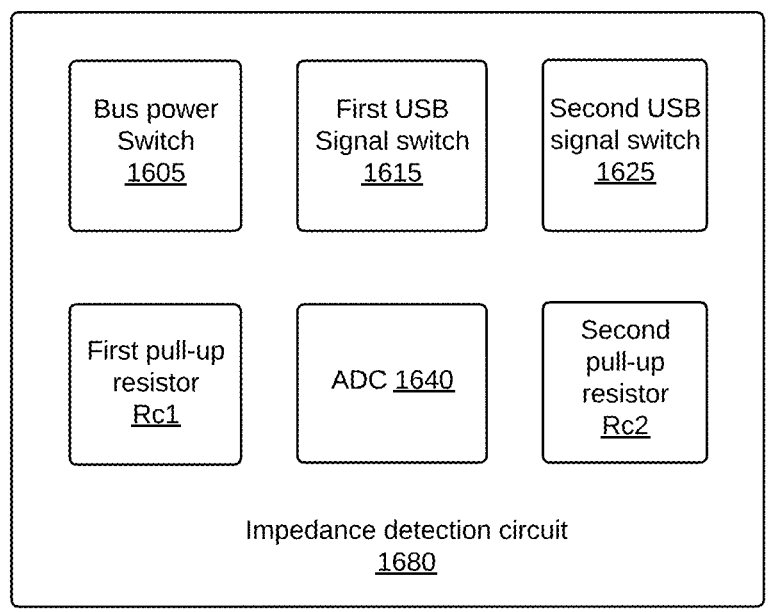
FIG. 17 is a block diagram of an impedance detection circuit, in accordance with embodiments of the present disclosure.

With reference to FIG. 15A, there is shown a simplified circuit diagram of a connection between a host device and a peripheral device wherein the peripheral device does not use the USB protocol, and may be using an alternate protocol such as CAN. In this case, when the peripheral device is plugged to the host device, the D+/D− pins on the host device are not connected (NC) to anything as these signal lines are not being used by the peripheral device. The host electronic device has an impedance detection circuit that is used to determine the voltage of the D+/D− pins. FIG. 15A shows only an impedance detection circuit at the host electronic device 1600 side. The impedance detection circuit is comprised of a bus power switch 1605, a first USB signal switch 1615, a second USB signal switch 1625, an analog-to-digital controller (ADC) in the form of ADC 1640, a first pull-up resistor Rc1, and a second pull-up resistor Rc2. The impedance detection circuit is coupled with the controller 1130. A conceptual block diagram of the impedance detection circuit is shown in FIG. 17. The host electronic device 1600 contains a USB-C port configured as a DFP and a CAN transceiver, but they are not shown in FIG. 15A for the sake of brevity.

The ADC 1640 is coupled to the controller 1130 and has at least two ADC channels for coupling to the D+/D− pins. The ADC 1640 provides digital values of the voltage on the USB 2.0 signal lines D+/D− to the controller 1130.

The bus power switch 1605 enables or disables connecting the bus power line Vbus from the peripheral device. The bus power switch 1605 is coupled to the controller 1130 and is controlled by the controller 1130. The controller 1130 may assert a signal line on a general purpose input/output (GPIO) pin thereof connected to the bus power switch 1605 to connect Vbus from the host side to the peripheral electronic device 1650. The controller 1130 may de-assert the same GPIO pins thus isolating the bus power signal Vbus from the peripheral electronic device 1650.

The host electronic device 1600 also contains a first USB signal switch 1615 for connecting the bus power line Vbus to the D+ pin, and a second USB signal switch 1625 for connecting the bus voltage line Vbus to the D− pin. Both the first USB signal switch 1615 and the second USB signal switch 1625 are controlled by the controller 1130 in the same manner as the bus power switch 1605. The controller 1130 can assert a GPIO pin connected to the first USB signal switch 1615 to enable the first USB signal switch 1615. Similarly, the controller can assert another GPIO pin connected to the second USB signal switch 1625 to enable the second USB signal switch 1625.

The bus power switch 1605, the first USB signal switch 1615, and the second USB signal switch 1625 can be electronic switches utilizing one or more transistors as known in the art. For example, the aforementioned switches may be implemented using Metal Oxide Semiconductor Field Effect Transistors (MOSTFETs), Bipolar Junction Transistors (BJTs), or another form of electronic switch or relay.

When the peripheral device is plugged into the host electronic device and the host electronic device 1600 is powered up, the controller 1130 first disables the bus power switch 1605 to isolate the power supply voltage Vbus from the peripheral device until the type of peripheral device is known. Next the controller 1130 enables the first USB signal switch 1615 and enables the ADC 1640 to read the analog voltage of the D+ signal line. In the embodiment of FIG. 15A, the peripheral electronic device 1650 does not use the USB 2.0 protocol. Accordingly, the D+ signal is not connected (NC) to anything on the peripheral electronic device. Since the first USB signal switch 1615 is enabled, the D+ signal line is connected to Vbus via the first pull-up resistor Rc1. Since the D+ signal line is NC, no current flows and there is no voltage drop over the first pull-up resistor Rc1. The voltage of the D+ line is thus equal to Vbus. The voltage of the D+ signal line is fed to the ADC 1640 and converted to a digital value provided to the controller 1130. The controller 1130 determines that the voltage of the D+ signal line indicates that the peripheral device does not use the D+ signal.

The controller 1130 may repeat the same process for the D− line. For example, the controller 1130 enables the second USB signal switch 1625 (while the bus power switch 1605 is still disabled to isolate Vbus from the peripheral device). Since D− is also not connected, no current flows through the second pull-up resistor Rc2. The ADC 1640 reads the voltage at the D− signal line and determines that the voltage is high (Vbus). As a result, the host electronic device 1600 determines that the peripheral electronic device 1650 does not use the USB 2.0 protocol.

In some embodiments, when the host electronic device 1600 determines that the peripheral device does not use the USB 2.0 protocol, the host electronic device 1600 determines that the peripheral device is using CAN if that is the only other possibility.

FIG. 15B is a simplified circuit diagram of a connection between a host device and a peripheral device, similar to FIG. 15A, but in which the peripheral device uses the USB 2.0 protocol.

When the peripheral device is plugged into the host electronic device and the host electronic device 1600 is powered up, the controller 1130 first disables the bus power switch 1605 to isolate Vbus from the peripheral device until the type of peripheral device is known. Next the controller 1130 enables the first USB signal switch 1615 and enables the ADC 1640 to read the voltage of the D+ signal line. Since the D+ signal line is connected to the ground via the resistance Rd, current flows from Vbus through the first pull-up resistor Rc1, the first USB signal switch 1615, and the first peripheral resistor Rd. The resistors Rc1 and Rd1 act as a voltage divider. The voltage at the D+ line is Vbus*Rd1/(Rc1+Rd1). The voltage at the D+ signal line is converted by the ADC 1640 to a digital value provided to the controller 1130. The controller evaluates the digital value corresponding to the D+ signal line voltage. When the controller determines that the voltage of the D+ signal line voltage indicates a USB peripheral device is connected to D+, the controller 1130 may then proceed to test the D− signal line in the same manner. Specifically, the controller 1130 enables the second USB signal switch 1625, and reads the voltage at D−. The voltage at the D− line is Vbus*Rd2/(Rc2+Rd2). Hence the controller 1130 determines that the line D− is used by the peripheral device. The host electronic device 1600 concludes that the peripheral device is a USB 2.0 device and not a CAN device.

The aforementioned method relies on the fact that voltage at D+ when a USB peripheral device is connected is lower than the voltage at D+ when a non-USB peripheral device is connected to the host device. For example, if the resistor Rc1 and the resistor Rd1 were equal, the voltage value at D+ would be Vbus/2. The voltage value at D+/D− when the peripheral device is using USB is thus significantly lower than when the peripheral device was not using USB (and was using CAN, for example). As such, it is possible to determine that a peripheral device connected to the host device is using USB 2.0. The same process may be repeated for the D− signal.

If the peripheral device is determined to be a USB 2.0 peripheral device, then the host electronic device 1600 turns off the first USB signal switch 1615 and enables the bus power switch 1605. At this point, other USB functions such as the orientation detection, current requirements, and power delivery as described above may be activated.

Figure 16:
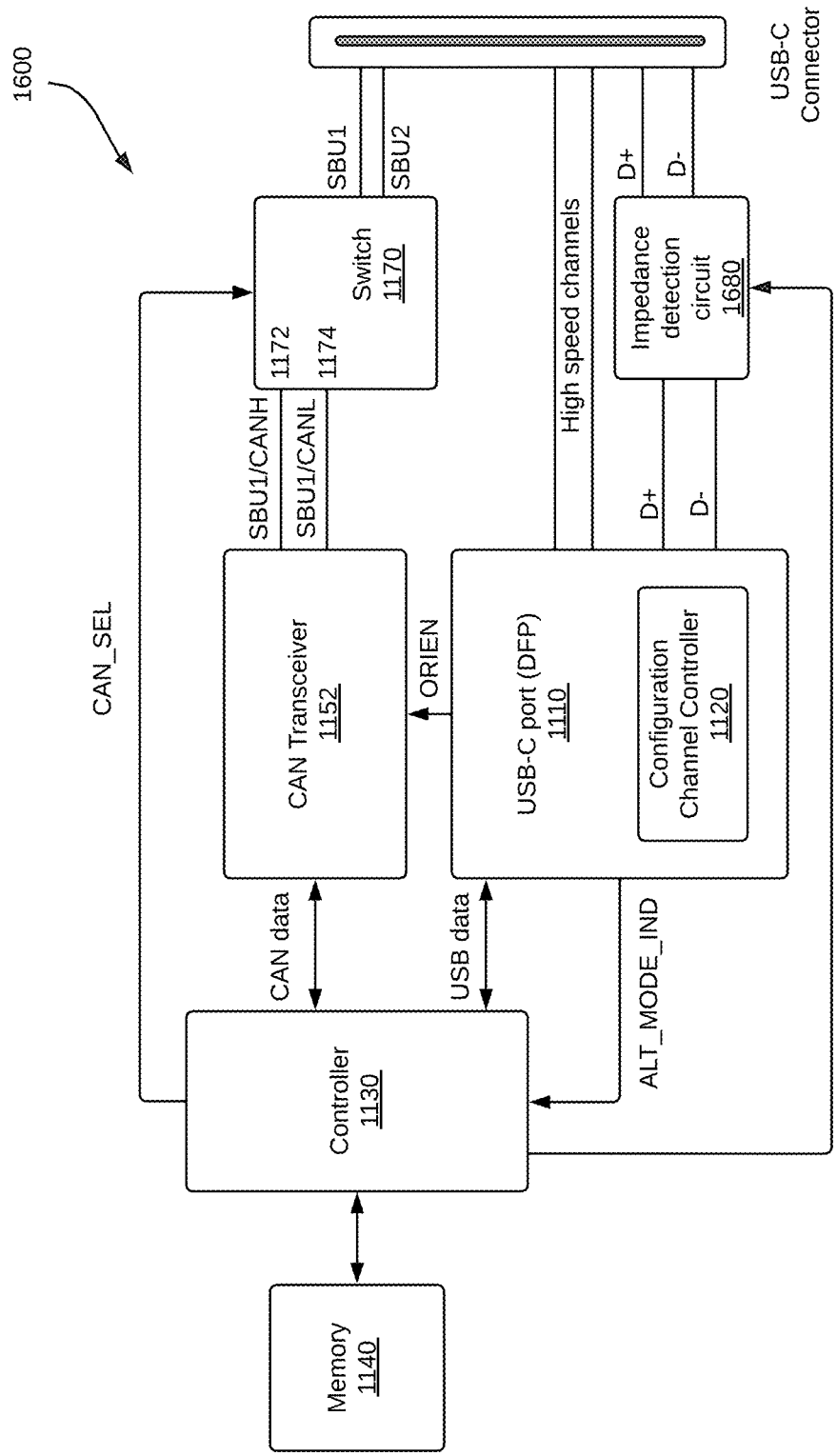
FIG. 16 depicts a host electronic device utilizing an impedance detection circuit, in accordance with embodiments of the present disclosure.

FIG. 16 depicts a host electronic device 1600 including an impedance detection circuit 1680, in accordance with embodiments of the present disclosure. The host electronic device comprises a controller 1130, a memory 1140, a USB-C port configured as a DFP 1110, a CAN transceiver 1152, a switch 1170, and a detection subsystem in the form of an impedance detection circuit 1680.

The controller 1130, the memory 1140, the DFP 1110, the CAN transceiver 1152, and the switch 1170 have been described earlier. The impedance detection circuit 1680 is logically depicted in FIG. 17, and comprises the resistor Rc, the bus power switch 1605, the first USB signal switch 1615, the second USB signal switch 1625, and the ADC 1640.

In operation, when the host electronic device 1600 is powered up, the controller 1130 enables the impedance detection circuit 1680 to determine whether the peripheral electronic device connected to the host electronic device is using USB or CAN. Upon determining whether the peripheral electronic device connected to the host electronic device is using USB or CAN, the host electronic device 1600 configures the switch 1170 to pass the appropriate signals.

When the detection subsystem (i.e., the impedance detection circuit) of FIG. 15A and FIG. 15B determines that the peripheral device uses CAN, the controller 1130 asserts the CAN select signal (CAN_SEL) causing the switch 1170 to pass CAN signals passed in the signals SBU1 and SBU2 to the CAN transceiver 1152 via the switch pin 1172 and the switch pin 1174. Conversely, when the detection subsystem (i.e., the impedance detection circuit 1680) indicates that the peripheral device uses USB, the controller 1130 de-asserts the CAN select signal (CAN_SEL). When CAN_SEL is de-asserted the switch pin 1172 and the switch pin 1174 of the switch 1170 become in the high impedance state. If the peripheral device uses USB 2.0, then data is exchanged over the USB 2.0 lines D+/D−.

Advantageously, a host electronic device utilizing the detection subsystem (i.e., the impedance detection circuit 1680) can accept connections from either a USB peripheral device or a CAN peripheral device. The CAN peripheral device can be a CAN-only peripheral device and does not need to include any USB interface circuitry.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:

1. A method in a host electronic device having a Universal Serial Bus (USB) Type C (USB-C) port configured as a downlink facing port (DFP), the method comprising:
    detecting, by a configuration channel controller of the USB-C port, a connection with a peripheral electronic device, over a host device connector of the USB-C port;
    in response to receiving, from the peripheral electronic device, a first indication indicating that the peripheral electronic device uses a USB protocol, commencing communication with the peripheral electronic device using the USB protocol over a plurality of USB signal lines of the USB-C port; and
    in response to receiving, from the peripheral electronic device, a second indication indicating that the peripheral electronic device uses a Controller Area Network (CAN) protocol:
        configuring the USB-C port to work in a USB-C alternate mode;
        determining a plurality of USB-C alternate mode signals used by the peripheral electronic device;
        routing the plurality of USB-C alternate mode signals used by the peripheral electronic device to a CAN transceiver of the host electronic device; and
        commencing communication with the peripheral electronic device using the CAN protocol.

2. The method of claim 1, wherein detecting the connection with the peripheral electronic device includes detecting an orientation of a peripheral device connector in relation to the host device connector.

3. The method of claim 2, wherein commencing communication comprises swapping the USB-C alternate mode signals used by the peripheral electronic device based on the orientation of the peripheral device connector in relation to the host device connector.

4. The method of claim 3, wherein:
    the CAN transceiver includes a polarity control module; and
    swapping the USB-C alternate mode signals comprises providing an indication of the orientation to the CAN transceiver.

5. The method of claim 1, wherein routing the plurality of USB-C alternate mode signals used by the peripheral electronic device comprises configuring a switch to pass the plurality of USB-C alternate mode signals used by the peripheral electronic device from the host device connector to the CAN transceiver based on the second indication.

6. The method of claim 1, wherein the second indication comprises a configuration channel message received by the configuration channel controller.

7. The method of claim 6, wherein the configuration channel message specifies the plurality of USB-C alternate mode signals used by the peripheral electronic device to send CAN data frames.

8. The method of claim 7, wherein determining the plurality of USB-C alternate mode signals comprises extracting the plurality of USB-C alternate mode signals used by the peripheral electronic device from the configuration channel message.

9. The method of claim 7, wherein the plurality of USB-C alternate mode signals used by the peripheral electronic device comprise a first sideband use signal (SBU1) and a second sideband use signal (SBU2).

10. The method of claim 9, wherein a CAN High (CANH) signal is sent over the first sideband use signal (SBU1), and a CAN Low (CANL) signal is sent over the second sideband use signal (SBU2).

11. A host electronic device comprising:
    a controller;
    a switch coupled to the controller;
    a controller area network (CAN) transceiver coupled to the switch;
    a Universal Serial Bus (USB) Type C (USB-C) port, including a configuration channel controller and a host device connector, the USB-C port coupled to both the switch and to the controller; and
    a memory coupled to the controller, the memory storing machine-executable programming instructions which, when executed by the controller, configure the host electronic device to:
        detect, by the configuration channel controller, a connection with a peripheral electronic device, over the host device connector;
        in response to receiving a first indication that the peripheral electronic device uses a USB protocol, commence communication with the peripheral electronic device using the USB protocol over a plurality of USB signal lines of the USB-C port; and
        in response to receiving, from the peripheral electronic device, a second indication that the peripheral electronic device uses a CAN protocol:
            configure the USB-C port to work in a USB-C alternate mode;
            determine a plurality of USB-C alternate mode signals used by the peripheral electronic device;
            pass the plurality of USB-C alternate mode signals to the CAN transceiver; and
            commence communication with the peripheral electronic device using the CAN protocol.

12. The host electronic device of claim 11, wherein the machine-executable programming instructions which configure the host electronic device to detect the connection with the peripheral electronic device comprise machine-executable programming instructions which configure the host electronic device to detect an orientation of a peripheral device connector in relation to the host device connector.

13. The host electronic device of claim 12, wherein the machine-executable programming instructions which configure the host electronic device to commence communication comprise machine-executable programming instructions which configure the host electronic device to swap the plurality of USB-C alternate mode signals used by the peripheral electronic device based on the orientation of the peripheral device connector in relation to the host device connector.

14. The host electronic device of claim 13, wherein:
the CAN transceiver includes a polarity control module; and
the machine-executable programming instructions which configure the host electronic device to swap the plurality of USB-C alternate mode signals comprise machine-executable programming instructions which configure the configuration channel controller to provide an indication of the orientation to the CAN transceiver.

15. The host electronic device of claim 11, wherein the machine-executable programming instructions which configure the host electronic device to pass the plurality of USB-C alternate mode signals used by the peripheral electronic device comprise machine-executable programming instructions which configure the host electronic device to configure the switch to pass the plurality of USB-C alternate mode signals used by the peripheral electronic device from the host device connector to the transceiver based on the second indication.

16. The host electronic device of claim 11, the second indication comprises a configuration channel message received by the configuration channel controller.

17. The host electronic device of claim 16, wherein the configuration channel message specifies the plurality of USB-C alternate mode signals used by the peripheral electronic device to send CAN data frames.

18. The host electronic device of claim 17, wherein the machine-executable programming instructions which configure the host electronic device to determine the plurality of USB-C alternate mode signals used by the peripheral electronic device comprise machine-executable programming instructions which configure the host electronic device to extract the plurality of USB-C alternate mode signals used by the peripheral electronic device from the configuration channel message.

19. The host electronic device of claim 17, wherein the plurality of USB-C alternate mode signals used by the peripheral electronic device comprise a first sideband use signal (SBU1) and a second sideband use signal (SBU2).

20. The host electronic device of claim 19, wherein a CAN High (CANH) signal is sent over the first sideband use signal (SBU1), and a CAN Low (CANL) signal is sent over the second sideband use signal (SBU2).

* * * * *